(12) United States Patent
Coughlin et al.

(10) Patent No.: US 9,243,911 B2
(45) Date of Patent: *Jan. 26, 2016

(54) MEETING NOTIFICATION AND MODIFICATION SERVICE

(71) Applicant: Facebook, Inc., Menlo Park, CA (US)

(72) Inventors: Stephen J. Coughlin, Falls Church, VA (US); Adrienne C. Meisels, New York, NY (US); Steven E. Greenberg, Frederick, MD (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,349

(22) Filed: Oct. 15, 2013

(65) Prior Publication Data
US 2014/0114571 A1 Apr. 24, 2014

Related U.S. Application Data

(63) Continuation of application No. 13/620,520, filed on Sep. 14, 2012, now Pat. No. 8,560,232, which is a continuation of application No. 13/296,130, filed on Nov. 14, 2011, now Pat. No. 8,364,400, which is a
(Continued)

(51) Int. Cl.
G01C 21/00 (2006.01)
G01C 21/20 (2006.01)
(Continued)

(52) U.S. Cl.
CPC ................ *G01C 21/00* (2013.01); *G01C 21/20* (2013.01); *G01C 21/3438* (2013.01);
(Continued)

(58) Field of Classification Search
CPC ...... G01C 21/343; G01C 21/362; G01C 21/20; G01C 21/3438; G06Q 10/109; G06Q 10/095; G06Q 10/063116
USPC ........... 701/408, 66, 465, 467, 300, 527, 533, 701/526, 541; 455/456.5
See application file for complete search history.

(56) References Cited

U.S. PATENT DOCUMENTS 4,301,506 A 11/1981 Turco
4,393,448 A 7/1983 Dunn et al.
(Continued)

OTHER PUBLICATIONS

International Search Report with Written Opinion for International Application No. PCT/US07/89039, dated Apr. 23, 2008, 16 pages.
(Continued)

*Primary Examiner* — Gertrude Arthur Jeanglaude
(74) *Attorney, Agent, or Firm* — Keller Jolley Preece

(57) ABSTRACT

Techniques are described for providing a meeting notification and automatic modification service. A system may be configured to identify an appointment in a calendar application, identify a geographic location of the appointment, and identify, before the appointment time, a geographic location of a first participant of the appointment. Based on the geographic information, the system may identify a route extending from the geographic location of the first participant to the geographic location of the appointment, and may identify a travel time associated with the route. Based on the travel time and the appointment time, the system may determine whether the first participant is estimated to arrive at the appointment on time and, based on the determination, the system may send a message to participants of the appointment or dynamically reschedule the appointment.

21 Claims, 26 Drawing Sheets

Related U.S. Application Data continuation of application No. 12/962,357, filed on Dec. 7, 2010, now Pat. No. 8,073,614, which is a continuation of application No. 11/966,562, filed on Dec. 28, 2007, now Pat. No. 7,869,941, which is a continuation-in-part of application No. 11/618,069, filed on Dec. 29, 2006, now Pat. No. 7,941,753.

(60) Provisional application No. 60/947,278, filed on Jun. 29, 2007, provisional application No. 60/945,805, filed on Jun. 22, 2007, provisional application No. 60/938,145, filed on May 15, 2007, provisional application No. 60/888,850, filed on Feb. 8, 2007.

(51) Int. Cl.
| | | |
|---|---|---|
| G01C 21/34 | (2006.01) | |
| G01C 21/36 | (2006.01) | |
| G06Q 10/06 | (2012.01) | |
| G06Q 10/10 | (2012.01) | |

(52) U.S. Cl.
CPC ......... *G01C 21/362* (2013.01); *G01C 21/3697* (2013.01); *G06Q 10/063116* (2013.01); *G06Q 10/109* (2013.01); *G06Q 10/1093* (2013.01); *G06Q 10/1095* (2013.01)

(56) References Cited

U.S. PATENT DOCUMENTS

| | | | |
|---|---|---|---|
| 4,413,322 | A | 11/1983 | Foster et al. |
| 4,528,552 | A | 7/1985 | Moriyama et al. |
| 4,546,439 | A | 10/1985 | Esparaza |
| 4,570,227 | A | 2/1986 | Tachi et al. |
| 4,646,089 | A | 2/1987 | Takanabe et al. |
| 4,689,747 | A | 8/1987 | Kurose et al. |
| 4,796,189 | A | 1/1989 | Nakayama et al. |
| 4,827,419 | A | 5/1989 | Selby, III |
| 4,866,626 | A | 9/1989 | Egli |
| 4,876,651 | A | 10/1989 | Dawson |
| 4,890,104 | A | 12/1989 | Takanabe et al. |
| 4,914,605 | A | 4/1990 | Loughmiller et al. |
| 4,926,336 | A | 5/1990 | Yamada |
| 4,937,753 | A | 6/1990 | Yamada |
| 4,954,958 | A | 9/1990 | Savage et al. |
| 4,962,458 | A | 10/1990 | Vertraete |
| 4,984,168 | A | 1/1991 | Neukrichner et al. |
| 5,031,104 | A | 7/1991 | Ikeda et al. |
| 5,041,983 | A | 8/1991 | Nakahara et al. |
| 5,067,081 | A | 11/1991 | Person |
| 5,115,399 | A | 5/1992 | Nimura et al. |
| 5,121,326 | A | 6/1992 | Moroto et al. |
| 5,168,452 | A | 12/1992 | Yamada et al. |
| 5,170,353 | A | 12/1992 | Verstraete |
| 5,172,321 | A | 12/1992 | Ghaem et al. |
| 5,189,430 | A | 2/1993 | Yano et al. |
| 5,191,406 | A | 3/1993 | Brandestini et al. |
| 5,191,532 | A | 3/1993 | Moroto et al. |
| 5,231,584 | A | 7/1993 | Nimura et al. |
| 5,270,937 | A | 12/1993 | Link et al. |
| 5,272,638 | A | 12/1993 | Martin et al. |
| 5,274,387 | A | 12/1993 | Kakihara et al. |
| 5,293,163 | A | 3/1994 | Kakihara et al. |
| 5,353,034 | A | 10/1994 | Sato et al. |
| 5,442,557 | A | 8/1995 | Kaneko |
| 5,486,822 | A | 1/1996 | Tenmoku et al. |
| 5,557,524 | A | 9/1996 | Maki |
| 5,608,635 | A | 3/1997 | Tamai |
| 5,732,385 | A | 3/1998 | Nakayama et al. |
| 5,790,974 | A * | 8/1998 | Tognazzini ................ 455/456.5 |
| 6,052,563 | A | 4/2000 | Macko |
| 6,282,489 | B1 | 8/2001 | Bellesfield et al. |
| 6,292,666 | B1 | 9/2001 | Siddiqui et al. |
| 6,401,034 | B1 | 6/2002 | Kaplan et al. |
| 6,498,982 | B2 | 12/2002 | Bellesfield et al. |
| 6,526,349 | B2 | 2/2003 | Bulloke et al. |
| 6,529,136 | B2 | 3/2003 | Cao et al. |
| 6,609,064 | B1 | 8/2003 | Dean |
| 6,678,613 | B2 | 1/2004 | Andrews et al. |
| 6,741,188 | B1 | 5/2004 | Miller |
| 6,801,139 | B2 | 10/2004 | Tretyak |
| 6,842,696 | B2 | 1/2005 | Silvester |
| 6,895,329 | B1 | 5/2005 | Wolfson |
| 6,920,384 | B2 | 7/2005 | Shiimado |
| 6,944,539 | B2 | 9/2005 | Yamada et al. |
| 6,958,692 | B1 | 10/2005 | Ratschunas |
| 6,993,430 | B1 | 1/2006 | Bellesfield et al. |
| 7,062,374 | B1 | 6/2006 | Walters et al. |
| 7,085,649 | B2 | 8/2006 | Baur et al. |
| 7,139,722 | B2 | 11/2006 | Perrella et al. |
| 7,188,026 | B2 | 3/2007 | Tzamaloukas |
| 7,313,767 | B2 | 12/2007 | Maki |
| 7,373,244 | B2 | 5/2008 | Kreft |
| 7,552,009 | B2 | 6/2009 | Nelson |
| 7,743,056 | B2 | 6/2010 | Meisels et al. |
| 7,869,941 | B2 | 1/2011 | Coughlin et al. |
| 7,925,525 | B2 | 4/2011 | Chin |
| 7,941,753 | B2 | 5/2011 | Meisels et al. |
| 8,073,614 | B2 * | 12/2011 | Coughlin et al. ............. 701/465 |
| 8,364,400 | B2 | 1/2013 | Coughlin et al. |
| 8,489,329 | B2 | 7/2013 | Coughlin et al. |
| 8,554,476 | B2 | 10/2013 | Coughlin et al. |
| 8,554,477 | B2 | 10/2013 | Coughlin et al. |
| 8,560,232 | B2 | 10/2013 | Coughlin et al. |
| 8,712,810 | B2 * | 4/2014 | Meisels et al. ..................... 705/5 |
| 2002/0019835 | A1 | 2/2002 | Baur et al. |
| 2002/0062236 | A1 | 5/2002 | Murashita et al. |
| 2002/0188603 | A1 | 12/2002 | Baird et al. |
| 2003/0001779 | A1 | 1/2003 | Mintz et al. |
| 2003/0036848 | A1 | 2/2003 | Sheha et al. |
| 2003/0163253 | A1 | 8/2003 | Lee et al. |
| 2003/0191578 | A1 | 10/2003 | Paulauskas et al. |
| 2003/0217073 | A1 * | 11/2003 | Walther et al. ............. 707/104.1 |
| 2004/0158392 | A1 | 8/2004 | Choi |
| 2004/0260465 | A1 | 12/2004 | Tu |
| 2005/0015316 | A1 | 1/2005 | Salluzzo |
| 2005/0027705 | A1 | 2/2005 | Sadri et al. |
| 2005/0055353 | A1 | 3/2005 | Marx et al. |
| 2005/0075119 | A1 | 4/2005 | Sheha et al. |
| 2005/0096841 | A1 | 5/2005 | Gedik et al. |
| 2005/0096946 | A1 | 5/2005 | Janakiraman et al. |
| 2005/0119927 | A1 | 6/2005 | Patel |
| 2005/0165631 | A1 | 7/2005 | Horvitz |
| 2005/0227712 | A1 | 10/2005 | Estevez et al. |
| 2005/0228860 | A1 | 10/2005 | Hamynen et al. |
| 2006/0047644 | A1 | 3/2006 | Bocking et al. |
| 2006/0058952 | A1 | 3/2006 | Cooper et al. |
| 2006/0218029 | A1 | 9/2006 | Chin |
| 2007/0106458 | A1 | 5/2007 | Iwami et al. |
| 2008/0054072 | A1 | 3/2008 | Katragadda et al. |
| 2008/0059890 | A1 | 3/2008 | Zinn et al. |
| 2008/0167938 | A1 * | 7/2008 | Meisels et al. ..................... 705/9 |
| 2010/0241351 | A1 | 9/2010 | Meisels et al. |
| 2013/0066545 | A1 | 3/2013 | Meisels et al. |
| 2013/0066546 | A1 | 3/2013 | Meisels et al. |
| 2013/0173160 | A1 | 7/2013 | Meisels et al. |
| 2013/0173161 | A1 | 7/2013 | Meisels et al. |

OTHER PUBLICATIONS

International Search Report and Written Opinion for International Application No. PCT/US07/65714, mailed Jun. 20, 2008.

Snyder, John P., "Map Projections—A Working Manual"; U.S. Geological Survey Professional Paper; 1987; U.S. Department of Intenor, 383 pages.

Sherman, Chris, "Search Engine Watch: Google Launches Local for Mobile," reprinted on Sep. 11, 2006 from http://searchenginewatch.com/showPage.html?page=sewprint&id=3561956.

Guzolek, J., and Koch, E., "Real-time Route Planning in Road Networks," 1989 IEEE, pp. 165-169.

Pruitt, Scarlet, "MapQuest Goes Mobile," PC World, reprinted from http://www.pcworld.com/article/id,119161-page,l/article.html on Jul. 26, 2007, 3 pages.

(56) References Cited

OTHER PUBLICATIONS

"Yahoo! Mobile. The Internet Now Fits Your Phone," reprinted from heep://mobile.yahoo.com/; ylt=AujFWTXXwBsSTR8HkP52L1bztAcJ on Jul. 26, 2007, 2 pages.
"Mobile Web Hop Online Anywhere on your Phone," reprinted from http://mobile.yahoo.com/mobileweb;ylt=AvZP2FpcYsq1R9iZxOpUIUnntAcJ on Jul. 26, 2007, 3 pages.
"Yahoo! Go 2.0 Improved! The Internet to Go," reprinted from http://mobile.yahoo.com/go; ylt=AqcFZ 48Qo6sCBg9mC0e6YktQcJ, on Jul. 26, 2007, 6 pages.
"MapQuest Help: What is Turn-by-Turn Navigation?," reprinted from http://help.mapquest.com/jive/entryjspa?extemalID=298 &categoryIDS=35 on Jul. 26, 2007, 1 page.
Singh, Bhagat, and Naps, Thomas L., Introduction to Data Structures, "The Shorrtte st Path Algorithm," West Publishing Company, 1985, pp. 215-233.
Sherman, C., "Google Launches Local for Mobile," SearchEngineWatch, reprinted from http://searchenginewatch.com/showPage.html?page=3561956 on Aug. 23, 2012, 4 pages.
European Office Action in App. No. 07866078.4-1955 dated Oct. 2, 2013.
U.S. Appl. No. 10/273,889, Sep. 10, 2003, Office Action.
U.S. Appl. No. 10/273,889, Apr. 16, 2004, Office Action.
U.S. Appl. No. 10/273,889, Jan. 24, 2005, Office Action.
U.S. Appl. No. 10/273,889, Aug. 10, 2005, Notice of Allowance.
U.S. Appl. No. 11/328,455, Dec. 19, 2006, Office Action.
U.S. Appl. No. 11/328,455, Jun. 26, 2007, Office Action.
U.S. Appl. No. 11/618,069, Dec. 31, 2008, Office Action.
U.S. Appl. No. 11/618,069, Jul. 22, 2009, Office Action.
U.S. Appl. No. 11/618,069, Jan. 5, 2010, Office Action.
U.S. Appl. No. 11/618,069, Jul. 9, 2010, Office Action.
U.S. Appl. No. 11/618,069, Jan. 5, 2011, Notice of Allowance.
U.S. Appl. No. 11/618,348, Jun. 3, 2008, Office Action.
U.S. Appl. No. 11/618,348, Nov. 13, 2008, Office Action.
U.S. Appl. No. 11/618,348, Apr. 14, 2009, Office Action.
U.S. Appl. No. 11/618,348, Sep. 23, 2009, Office Action.
U.S. Appl. No. 11/618,348, Feb. 8, 2010, Notice of Allowance.
U.S. Appl. No. 11/966,562, Apr. 9, 2010, Office Action.
U.S. Appl. No. 11/966,562, Sep. 7, 2010, Notice of Allowance.
U.S. Appl. No. 11/966,639, Oct. 7, 2010, Office Action.
U.S. Appl. No. 11/966,639, Mar. 16, 2011, Office Action.
U.S. Appl. No. 11/966,639, Aug. 17, 2011, Office Action.
U.S. Appl. No. 11/966,639, Feb. 1, 2012, Office Action.
U.S. Appl. No. 11/966,639, Jan. 22, 2014, Notice of Allowance.
U.S. Appl. No. 12/791,165, Aug. 31, 2011, Office Action.
U.S. Appl. No. 12/791,165, Feb. 2, 2012, Office Action.
U.S. Appl. No. 12/791,165, Jun. 18, 2012, Office Action.
U.S. Appl. No. 12/791,165, Feb. 22, 2013, Office Action.
U.S. Appl. No. 12/791,165, Jun. 3, 2013, Office Action.
U.S. Appl. No. 12/791,165, Oct. 24, 2013, Office Action.
U.S. Appl. No. 12/962,357, Jan. 25, 2011, Office Action.
U.S. Appl. No. 12/962,357, Jul. 26, 2011, Notice of Allowance.
U.S. Appl. No. 13/296,130, Feb. 6, 2012, Office Action.
U.S. Appl. No. 13/296,130, May 24, 2012, Notice of Allowance.
U.S. Appl. No. 13/296,130, Sep. 25, 2012, Notice of Allowance.
U.S. Appl. No. 13/620,513, Apr. 10, 2013, Office Action.
U.S. Appl. No. 13/620,513, Jul. 25, 2013, Office Action.
U.S. Appl. No. 13/620,513, Nov. 29, 2013, Office Action.
U.S. Appl. No. 13/620,513, Apr. 28, 2014, Office Action.
U.S. Appl. No. 13/620,516, Apr. 10, 2013, Office Action.
U.S. Appl. No. 13/620,520, Jan. 28, 2013, Office Action.
U.S. Appl. No. 13/620,520, Jun. 24, 2013, Notice of Allowance.
U.S. Appl. No. 13/620,520, Jul. 19, 2013, Notice of Allowance.
U.S. Appl. No. 13/620,523, Jan. 29, 2013, Office Action.
U.S. Appl. No. 13/620,523, Jun. 20, 2013, Notice of Allowance.
U.S. Appl. No. 13/620,525, Jan. 29, 2013, Office Action.
U.S. Appl. No. 13/620,525, Jun. 24, 2013, Notice of Allowance.
U.S. Appl. No. 13/620,525, Jul. 22, 2013, Notice of Allowance.
U.S. Appl. No. 13/620,529, Jan. 29, 2013, Office Action.
U.S. Appl. No. 13/620,529, May 24, 2013, Notice of Allowance.
U.S. Appl. No. 13/620,529, Jun. 14, 2013, Notice of Allowance.
U.S. Appl. No. 13/620,533, Dec. 20, 2012, Office Action.
U.S. Appl. No. 13/620,536, Dec. 20, 2012, Office Action.
U.S. Appl. No. 13/620,536, Aug. 23, 2013, Office Action.
U.S. Appl. No. 12/791,165, Jun. 6, 2014, Office Action.
Canadian Office Action in App. No. 2674031 dated Sep. 23, 2014 (4 pgs).
U.S. Appl. No. 13/620,513, Aug. 13, 2014, Office Action.
U.S. Appl. No. 12/791,165, Dec. 12, 2014, Office Action.
U.S. Appl. No. 13/620,513, Jul. 7, 2015, Notice of Allowance.
U.S. Appl. No. 13/620,513, Sep. 3, 2015, Notice of Allowance.

* cited by examiner

100A

| MONDAY, APRIL 23, 2002 | ☐ IDENTIFY A TRAVEL ROUTE AND RESERVE TIME BLOCK ON THE CALENDAR TO ACCOUNT FOR TRAVEL TIME BETWEEN APPOINTMENTS |
|---|---|
| 8:00 AM | |
| 9:00 | |
| 10:00 | MEET WITH PATENT ATTORNEY KARL RENNER AT 1425 K STREET, NW, WASHINGTON, DC 20005 |
| 11:00 | |
| 12:00 PM | |
| 1:00 | PERSONAL INTERVIEW WITH PATENT EXAMINER JOE SMITH AT U.S. PATENT AND TRADEMARK OFFICE 600 DULANY ST., ALEXANDRIA, VA 20854 |
| 2:00 | |
| 3:00 | |
| 4:00 | |
| 5:00 | |

| MONDAY, APRIL 23, 2002 | |
|---|---|
| 8:00 AM | |
| 9:00 | |
| 10:00 | APPOINTMENT WITH PATENT ATTORNEY KARL RENNER AT 1425 K STREET, NW, WASHINGTON, DC 20005 |
| 11:00 | |
| 12:00 PM | THIS TIME IS RESERVED FOR TRAVEL TIME FROM 1425 K STREET, NW, WASHINGTON, DC 2005 TO U.S. PATENT AND TRADEMARK OFFICE |
| 1:00 | PERSONAL INTERVIEW WITH PATENT EXAMINER JOE SMITH AT U.S. PATENT AND TRADEMARK OFFICE |
| 2:00 | |
| 3:00 | |
| 4:00 | |
| 5:00 | |
| 6:00 | |
| 7:00 | |
| 8:00 | |
| 9:00 | |

Your first appointment is with Patent Attorney Karl Renner at 10:00 am.

Your second appointment is with Patent Examiner Joe Smith at United Stated Patent and Trademark office. However, we do not have an address for the USPTO. Please specify the (address).

325 — ☐ Directions/Mapping

ALERT DISPLAY

EVEN AFTER TAKING INTO ACCOUNT THE TRAVEL TIME FROM THE FIRST APPOINTMENT TO THE SECOND APPOINTMENT, THERE REMAINS AN UNSCHEDULED TIME PERIOD IN YOUR CALENDAR BETWEEN THE FIRST AND SECOND APPOINTMENTS. WHAT WOULD YOU LIKE TO DO DURING THIS TIME?

☐ SPEND MORE TIME AT THE FIRST APPOINTMENT LOCATION

☐ STOP AT A GAS STATION

☐ START TRAVELING TOWARD THE SECOND APPOINTMENT LOCATION

☐ LOCATE (A POINT OF INTEREST) NEAR (DESTINATION)

Alert Display

It is currently 11:00 am, and you are at the first appointment location.

Your second appointment is at 1:00 pm, and the second appointment location appears to be at U.S. Patent and Trademark Office.

Under (normal) conditions, it would take you 60 minutes to arrive at the second appointment location.

However, it appears following conditions have been detected:
   There is a heavy traffic due to an accident on the I-60.

Now, it will take you 3 hours to arrive at the second appointment location.

We suggest you leave now in order to arrive on time at the second appointment location, and you should take a different route, with a travel time of 2 hours, than the previously calculated route to arrive at the second appointment location.

Please (view) the updated route.

ALERT DISPLAY

WE NOTICE YOUR FIRST APPOINTMENT AT 10:00 AM IS SUPPOSED TO LAST FOR AT LEAST 60 MINUTES AND YOUR SECOND APPOINTMENT IS AT 12:00 PM. WE ALSO NOTICE THAT IT TAKES 120 MINUTES TO ARRIVE AT THE SECOND APPOINTMENT LOCATION FROM THE FIRST APPOINTMENT LOCATION PLUS AN APPROXIMATE 10 MINUTES TO GET FROM THE CAR TO THE MEETING. WHAT WOULD YOU LIKE TO DO?

☐ SPEND LESS TIME AT THE FIRST APPOINTMENT

☐ CANCEL OR RESCHEDULE THE SECOND APPOINTMENT

☐ ARRIVE LATE AT THE SECOND APPOINTMENT LOCATION

ALERT DISPLAY

IT IS CURRENTLY 11:00 AM AND IT SEEMS THAT YOU HAVE DEVIATED FROM THE ORIGINAL ROUTE. YOU ARE PRESENT AT 1100 F STREET, NW, WASHINGTON, DC 20005.

YOUR SECOND APPOINTMENT IS AT 1:00 PM.

FROM YOUR NEW LOCATION, IT TAKES 30 MINUTES TO ARRIVE AT YOUR SECOND APPOINTMENT LOCATION.

CLICK HERE FOR DIRECTIONS TO THE SECOND APPOINTMENT LOCATION FROM THE PRESENT LOCATION

| | |
|---|---|
| MONDAY, APRIL 23, 2002 | |
| 8:00 AM | |
| 9:00 | |
| 10:00 | APPOINTMENT WITH PATENT ATTORNEY KARL RENNER AT 1425 K STREET, NW, WASHINGTON, DC 20005 |
| 11:00 | |
| 12:00 PM | THIS TIME IS RESERVED FOR TRAVEL TIME FROM 1425 K STREET, NW, WASHINGTON, DC 2005 TO U.S. PATENT AND TRADEMARK OFFICE |
| 1:00 | PERSONAL INTERVIEW WITH PATENT EXAMINER JOE SMITH AT U.S. PATENT AND TRADEMARK OFFICE |
| 2:00 | |
| 3:00 | |
| 4:00 | |
| 5:00 | |
| 6:00 | |
| 7:00 | |
| 8:00 | |
| 9:00 | |

| 1200D MONDAY, APRIL 23, 2002 | |
|---|---|
| 8:00 AM | |
| 9:00 | |
| 10:00 | APPOINTMENT WITH PATENT ATTORNEY KARL RENNER AT 1425 K STREET, NW, WASHINGTON, DC 20005 — 1215 |
| 11:00 | APPOINTMENT WITH DR. JONES AT 11208 CAMP RD. BETHESDA, MARYLAND — 1265 |
| 12:00 PM | THIS TIME IS RESERVED FOR TRAVEL TIME FROM 1425 K STREET, NW, WASHINGTON, DC 20005 TO U.S. PATENT AND TRADEMARK OFFICE — 1230 |
| 1:00 | PERSONAL INTERVIEW WITH PATENT EXAMINER JOE SMITH AT U.S. PATENT AND TRADEMARK OFFICE — 1220 |
| 2:00 | |
| 3:00 | |
| 4:00 | |
| 5:00 | |
| 6:00 | |
| 7:00 | |
| 8:00 | |
| 9:00 | |

1210

1270: THIS APPOINTMENT PRESENTS CONFLICT WITH BOTH THE FIRST AND SECOND APPOINTMENT

1500

1600

```
ALERT DISPLAY

IT IS CURRENTLY 11:30 AM, AND YOU ARE AT THE FIRST
APPOINTMENT LOCATION AT 1425 K ST. NW,
WASHINGTON, DC, 20005.

YOUR NEXT APPOINTMENT IS AT 12:00, AND IT IS LOCATED
AT THE UNITED STATES PATENT AND TRADEMARK
OFFICE.

WE NOTE THAT YOUR TRAVEL TIME TO THE NEXT
APPOINTMENT (45 MINUTES) EXCEEDS THE AMOUNT OF
TIME REMAINING UNTIL THE APPOINTMENT TIME AT
WHICH THE APPOINTMENT IS DUE TO START
```

```
ALERT DISPLAY

☐ SEND MESSAGE TO OTHER
  PARTICIPANTS INFORMING
  THEM OF AN ESTIMATED
  ARRIVAL TIME (12:15 PM)

☐ RESCHEDULING THE APPOINTMENT

☐ CHANGE THE MODALITY OF TRAVEL
  (CURRENT MODALITY: WALKING)
```

FIG. 17

MEETING NOTIFICATION AND MODIFICATION SERVICE

CROSS REFERENCE TO RELATED APPLICATIONS

The present application is a continuation of U.S. patent application Ser. No. 13/620,520, filed Sep. 14, 2012, which is a continuation of U.S. patent application Ser. No. 13/296,130, filed Nov. 14, 2011 now issued as U.S. Pat. No. 8,364,400, which is a continuation of U.S. patent application Ser. No. 12/962,357, filed on Dec. 7, 2010 now issued as U.S. Pat. No. 8,073,614, which is a continuation of U.S. patent application Ser. No. 11/966,562, filed on Dec. 28, 2007 now issued as U.S. Pat. No. 7,869,941, which is a continuation-in-part of U.S. patent application Ser. No. 11/618,069, filed on Dec. 29, 2006 now issued as U.S. Pat. No. 7,941,753, and claims the benefit of and priority to U.S. provisional application No. 60/947,278, filed on Jun. 29, 2007, U.S. provisional application No. 60/945,805, filed on Jun. 22, 2007, U.S. provisional application No. 60/938,145, filed on May 15, 2007, and U.S. provisional application No. 60/888,850, filed on Feb. 8, 2007. Each of the aforementioned patent(s) and application(s) are hereby incorporated by reference in their entirety.

TECHNICAL FIELD

This disclosure relates to meeting notification and modification service.

BACKGROUND

A user may populate an electronic calendar with appointments that take place at different locations. The electronic calendar may be, for example, a Microsoft Outlook calendar, and may be manually programmed to include a date and time of appointments and locations associated with the appointments.

SUMMARY

In one aspect, an appointment in a calendar application is identified, and a geographic location of the appointment is identified. An appointment time at which the appointment is due to start and a current time are identified, and an amount of time remaining between the current time and the appointment time at which the appointment is due to start is identified, first participant of the appointment is identified at the current time. A route extending from the geographic location of the first participant to the geographic location of the appointment is identified, a travel time associated with the route is identified, and it is determined whether the travel time exceeds the amount of time remaining until the appointment time. If it is determined that the travel time exceeds the amount of time remaining, a communication is sent.

Implementations may include one or more of the following features. For example, the travel time may be identified based on a current road condition or traffic flow, or the travel time may be identified based on a historic traffic flow. A modality of travel of the first participant to the geographic location of the appointment may be identified, and, based on the modality of travel, the travel time associated with the route may be identified.

Also, a time threshold at which travel could be completed by adding the travel time to the current time may be identified, and a later time to schedule the appointment may be determined based on the time threshold. The later time may be the same as or later than the time threshold. The appointment time may be postponed to the later time to thereby enable the first participant to arrive at the geographic location of the appointment. Based on the postponed appointment time, updated appointment information may be sent to at least one participant of the appointment or another designee.

In some implementations, the first participant may be alerted that the first participant will be late to the appointment, and/or a second participant, other than the first participant, may be alerted that the first participant will be late to the appointment. In these implementations, the second participant may be informed of the geographic location of the first participant and the travel time of the first participant to the geographic location of the appointment, and the second participant may be informed that the appointment is being changed to account for the travel time.

In some examples, the calendar application of the first and second participants may be accessed, and time availability of the first and second participants may be identified. In these examples, a mutually convenient time for the first and second participants to participate in a rescheduled version of the appointment may be determined based on the time availability of the first and second participants, and the appointment may be automatically rescheduled at the mutually convenient time for the first and second participants. Further, in these examples, travel time may be accounted for in each of the first and second participants' schedules, and the mutually convenient time may be selected from among multiple mutually convenient times based on, among other factors, temporal proximity to geographic locations associated with adjacent appointments in one or both of the first and second participants' calendars.

Also, one or more suggestions may be provided to the first participant to respond to the alert message. The one or more suggestions may include a suggestion to change the modality of travel used to compute the travel time associated with the route, and/or a suggestion to send a message to the second participant informing the second participant of an estimated arrival time. Telephone contact information may be accessed for the second participant, and a suggestion may be provided to the first participant to call the second participant. The suggestion may include a telephone number for the second participant determined based on the accessed telephone contact information for the second participant.

In some implementations, a current geographic location of the first participant may be identified. In these implementations, the current geographic location of the first participant may be identified based on a location-based technology utilized by a client device of the first participant. The client device may utilize a global positioning system. Further, a notification window may be displayed at a specified time that precedes the appointment time by at least the travel time to the geographic location of the appointment if it is determined that the travel time does not exceed the amount of time remaining until the appointment time.

In another aspect, appointment information within a calendar application is dynamically updated. An appointment within a calendar application is identified, and appointment times at which the appointment is due to start and due to end are identified. It is identified that the appointment has been delayed for a certain amount of time, and at least one remaining appointment within the calendar application is identified. A need to reschedule at least one remaining appointment is determined based on the certain amount of time that the appointment has been delayed, it is confirmed with at least one participant of the appointment that the remaining appointment should be rescheduled. The remaining appointment is dynamically rescheduled within the calendar application such that a starting time of the remaining appointment is postponed by the certain amount of time.

Implementations may include one or more of the following features. For instance, participants of the remaining appointment may be informed of the rescheduling of the remaining appointment. Availability of participants of the appointment at the postponed starting time may be confirmed, and the participants of the appointment may be notified when conflicts with the postponed starting time exist.

In a further aspect, travel conditions are monitored and changes to travel conditions associated with one or more participants traveling to an appointment are dynamically processed. An amount of time remaining until an appointment time at which an appointment is due to start is identified, and a travel time corresponding to a route of travel associated with one or more participants traveling to the appointment is identified. Based on the identified amount of time remaining until the appointment time and the identified travel time corresponding to the route, it is determined that the one or more participants traveling to the appointment are estimated to arrive at the appointment on time. Travel conditions for the route of travel associated with the one or more participants traveling to the appointment are monitored and a change in travel conditions is detected for the route of travel associated with the one or more participants traveling to the appointment. In response to detecting the change in travel conditions, an updated amount of time remaining until the appointment time at which the appointment is due to start is determined, and a current location of the one or more participants is determined. Based on the current location of the one or more participants, an updated travel time corresponding to the route of travel associated with the one or more participants traveling to the appointment is determined. Based on the updated amount of time remaining until the appointment time and the updated travel time corresponding to the route of travel, it is determined that the one or more participants traveling to the appointment are estimated to arrive at the appointment late based on the changed travel conditions. In response to determining that the one or more participants traveling to the appointment are estimated to arrive at the appointment late based on the changed travel conditions, a communication is sent.

Implementations may include one or more of the following features. For example, one or more alternative routes may be identified for the one or more participants traveling to the appointment, one or more alternative travel times associated with each of the identified one or more alternative routes of travel may be determined, and it may be determined whether at least one of the one or more alternative travel times is less than the updated travel time. Conditioned on determining that at least one of the one or more alternative travel times is less than the updated travel time, at least one of the one or more alternative routes of travel for which the one or more alternative travel times is lowest is selected, and the one or more participants are alerted about the selected at least one of the one or more alternative routes of travel. Conditioned on determining that at least one of the one or more alternative travel times is not less than the updated travel time, the one or more participants are alerted about current travel conditions and are informed that the route of travel remains most efficient.

In some examples, an alert message may be sent to at least one of the participants of the appointment. The alert message may indicate that the one or more participants traveling to the appointment are estimated to arrive at the appointment late based on the changed travel conditions. Also, the appointment may be dynamically rescheduled based on the updated travel time, and the participants of the appointment may be notified that the appointment has been dynamically rescheduled. One or more subsequent appointments in a calendar of at least one of the participants of the appointment may be identified, and the one or more subsequent appointments may be dynamically rescheduled based on the dynamically rescheduled appointment.

In yet another aspect, a participant is assisted with a calendar appointment when the participant diverges from a suggested route for traveling to the calendar appointment. A current geographic location of a participant traveling to an appointment scheduled in a calendar application used by the participant is determined, and information indicative of the suggested route of travel is accessed. The geographic location of the participant is compared to one or more geographic locations associated with the route of travel suggested for the participant, and, based on comparison results, it is determined whether the current geographic location of the participant traveling to the appointment differs more than a threshold from the one or more geographic locations associated with the route of travel suggested for the participant.

Conditioned on determining that the current geographic location of the participant traveling to the appointment differs more than the threshold from the one or more geographic locations associated with the route of travel suggested for the participant, an updated route of travel to the appointment is determined based on the current geographic location of the participant, and a travel time associated with the updated route of travel to the appointment is determined. Based on the travel time associated with the updated route of travel, it is determined whether the participant traveling along the updated route is estimated to arrive at the appointment on time. Conditioned on determining that the participant traveling along the updated route is estimated to arrive at the appointment on time, the participant is provided with information related to the updated route of travel. Conditioned on determining that the participant traveling along the updated route is not estimated to arrive at the appointment on time, the participant is provided with information related to the updated route of travel, and a communication is sent.

Conditioned on determining that the current geographic location of the participant traveling to the appointment does not differ more than the threshold from the one or more geographic locations associated with the route of travel suggested for the participant, it is determined whether the current geographic location of the participant is on the route. Conditioned on determining that the current geographic location of the participant is not on the route, information is provided to the participant related to how to return to the route.

Implementations may include one or more of the following features. For example, an alert message may be sent to at least one of the participants of the appointment. The alert message may indicate that the participant traveling to the appointment is not estimated to arrive at the appointment on time. The appointment may be dynamically rescheduled based on the travel time associated with the updated route of travel to the appointment, and the participants of the appointment may be notified that the appointment has been dynamically rescheduled. One or more subsequent appointments in a calendar of at least one of the participants of the appointment may be identified, and the one or more subsequent appointments may be dynamically rescheduled based on the dynamically rescheduled appointment.

In another aspect, time associated with modality-specific incidentals to travel is accounted for in dynamically assisting a participant in handling an appointment. An appointment in a calendar associated with a participant of the appointment is identified, and an appointment time at which the appointment is due to start and a current time are identified. An amount of time remaining between the appointment time at which the appointment is due to start and the current time is identified, and a geographic location of the appointment is identified. A current geographic location of the participant of the appointment is identified, and a route extending from the current geographic location of the participant to the geographic location of the appointment is identified. A modality of travel for traveling the route extending from the geographic location of the participant to the geographic location of the appointment is determined, and a modality-based travel time associated with traveling the route extending from the geographic location of the participant to the geographic location of the appointment using the determined modality of travel is determined. Based on the determined modality of travel, at least one incidental travel time associated with traveling the route extending from the geographic location of the participant to the geographic location of the appointment is determined, and a total travel time for traveling the route extending from the geographic location of the participant to the geographic location of the appointment is determined based on the determined modality-based travel time and the determined at least one incidental travel time. It is determined whether the total travel time exceeds the amount of time remaining until the appointment time. Conditioned on determining that the total travel time exceeds the amount of time remaining until the appointment time, the participant is dynamically assisted in handling the appointment.

Implementations may include one or more of the following features. For instance, an automobile may be determined as the modality of travel for traveling the route extending from the geographic location of the participant to the geographic location of the appointment, and a mapping device may be used to compute an automobile travel time associated with traveling the route extending from the geographic location of the participant to the geographic location of the appointment using the automobile. A walking travel time associated with walking from a building to the automobile prior or subsequent to traveling the route extending from the geographic location of the participant to the geographic location of the appointment using the automobile may be determined, and the walking travel time may be added to the automobile travel time.

In some examples, an airplane may be determined as the modality of travel for traveling the route extending from the geographic location of the participant to the geographic location of the appointment and an air travel time associated with traveling the route extending from the geographic location of the participant to the geographic location of the appointment using the airplane may be determined. A security travel time associated with going through security prior to boarding the airplane may be determined, and the security travel time maybe added to the air travel time.

Also, content associated with the appointment may be accessed, and information associated with a distance extending from the geographic location of the participant to the geographic location of the appointment may be accessed. The content associated with the appointment and the information associated with the distance extending from the geographic location of the participant to the geographic location of the appointment may be analyzed, and, based on the analysis, the modality of travel for traveling the route extending from the geographic location of the participant to the geographic location of the appointment may be automatically determined.

Further, the user may be able to select the modality of travel for traveling the route extending from the geographic location of the participant to the geographic location of the appointment. The appointment may be dynamically rescheduled based on the total travel time. An alert message may be sent to at least one of the participants of the appointment. The alert message may indicate that the participant is estimated to arrive at the appointment late.

In some implementations, multiple, different modalities of travel for traveling the route extending from the geographic location of the participant to the geographic location of the appointment may be determined, and a modality-based travel time associated with traveling the route extending from the geographic location of the participant to the geographic location of the appointment may be determined using the determined multiple, different modalities of travel. In these implementations, at least one incidental travel time associated with transitioning from a first modality of travel to a second modality of travel may be determined.

The details of one or more implementations are set forth in the accompanying drawings and the description below. Other features will be apparent from the description and drawings, and from the claims.

DESCRIPTION OF DRAWINGS

FIGS. 1A and 1B illustrate exemplary calendar application interfaces, configured to make a user of the calendar application able to identify a travel route extending from a geographic location of a first appointment to a geographic location of a second appointment and to reserve, within the calendar application, a time block for a travel time associated with the travel route.

FIGS. 3A and 3B illustrate an exemplary process and an exemplary user interface for soliciting and receiving, from the user, an address associated with an appointment.

FIG. 5 illustrates an exemplary UI used to inform a user of an unscheduled time in the user's calendar.

FIG. 8B illustrates an exemplary UI that may be generated as a result of the process illustrated in FIG. 8A and presented to the user to alert a user about a change in current road conditions.

FIG. 9B illustrates an exemplary user interface that may be generated as a result of the process illustrated in FIG. 9A to alert a user about conflicting appointments.

FIG. 10B illustrates an exemplary user interface that may be generated as a result of the processes illustrated in FIG. 10A to alert a user that the user has deviated from an original route.

FIGS. 12A-12D illustrate, within UIs 1200A-1200D, an exemplary sequence of interact ions between a calendar application and a user wishing to schedule one or more appointments using the process 1100 described with respect to FIG. 11.

FIG. 16 illustrates an exemplary alert interface used for alerting a participant of an appointment that he or she is not likely to arrive at the appointment location on time.

FIG. 17 illustrates an exemplary alert interface showing options that are presented to a participant of an appointment to avoid a scheduling conflict.

DETAILED DESCRIPTION

Figure 2:
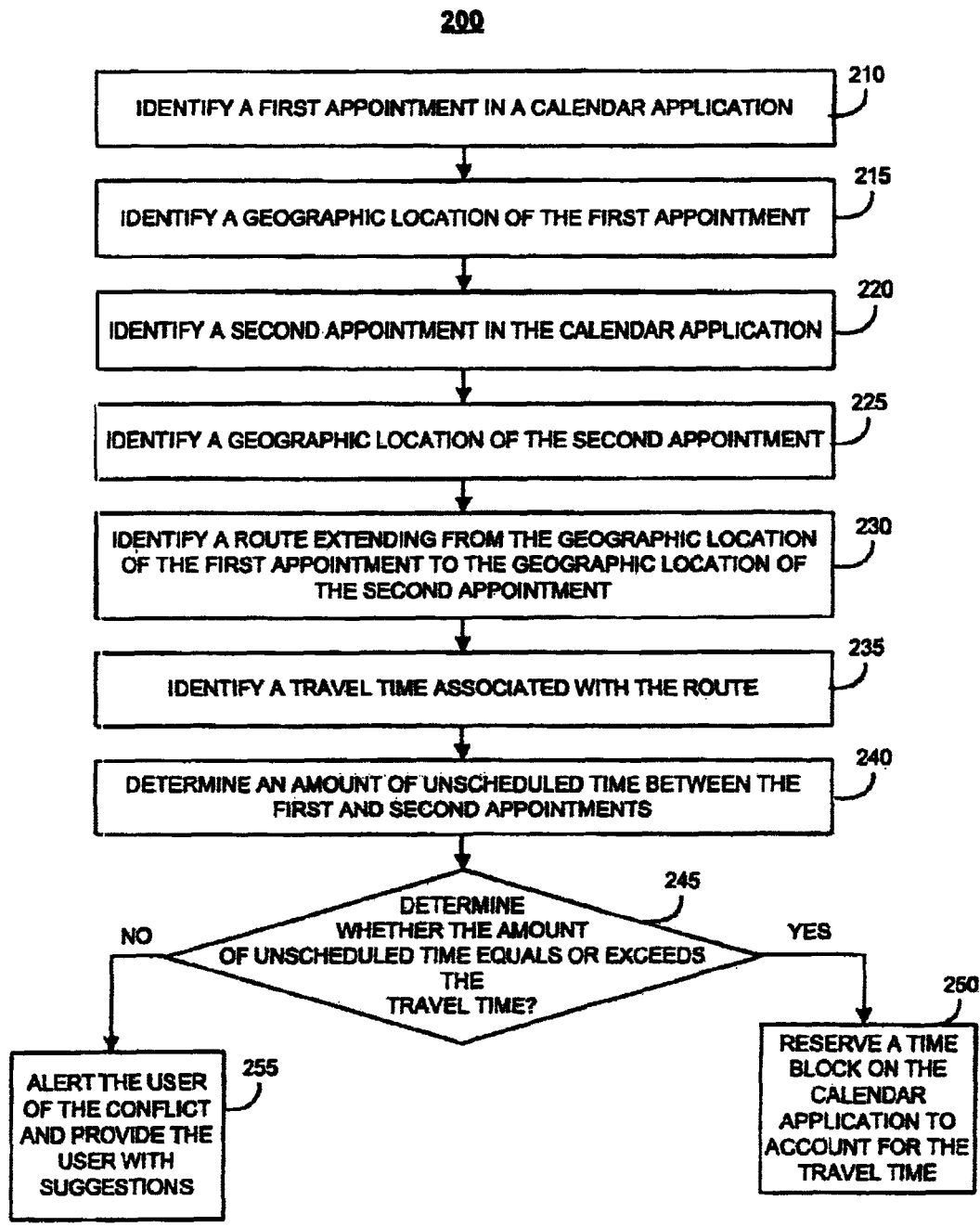
FIG. 2 illustrates an exemplary process used to identify a travel route between already scheduled first and second appointments and to reserve, within a calendar application, a time block to account for a travel time associated with the travel route.
Figure 3A:
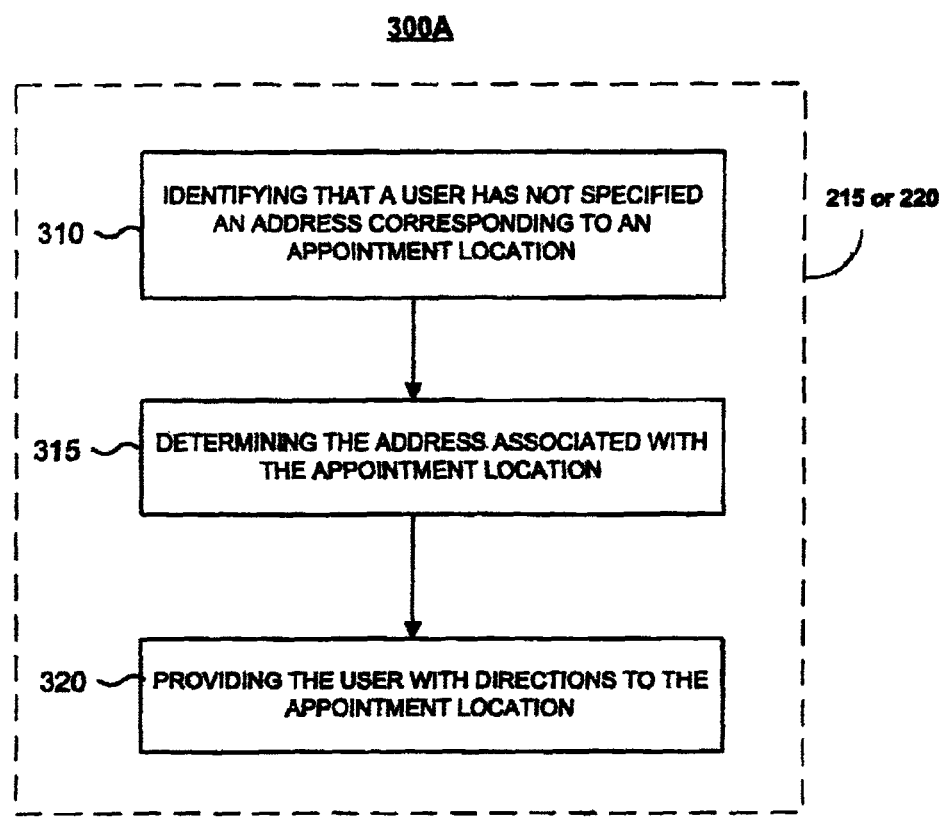

Generating directions to geographic locations of appointments stored in a calendar application can be a complex undertaking. For example, a user who maintains a calendar with appointments that take place at various locations may find it difficult or cumbersome to identify a travel route through the locations of the user's appointments. Particularly, the user may find it time-consuming to manually look-up and print out directions for segments of a travel route before leaving, for example, the user's home or work place.

To reduce the user's burden in identifying a travel route through the geographic locations of the user's appointments, in one implementation described generally with respect to FIGS. 1A-1B and 2-4, a calendar application is configured to allow the user to automatically generate appointment-to-appointment directions and to reserve a time block between user's appointments to account for the travel time associated with a route extending from one appointment to the next. To this end, the calendar application includes a navigation component and further includes a control option, manifested by an icon or a "setting," selection of which results in generation a travel route between multiple appointments and further results in reservation of a time block within the user's calendar to account for the travel time associated with the travel route.

To illustrate, assume that a user has two appointments within a calendar application (e.g., a first appointment and a second appointment) and that the user selects, from within the calendar application, the control icon. In response, the calendar application automatically (1) identifies a travel route extending from a geographic location of the first appointment to a geographic location of the second appointment, (2) identifies a travel time associated with the travel route, and (3) places a hold on the user's calendar to account for such travel time. Additionally, the calendar application may provide the user with a reminder about the user's second appointment, taking into account the travel time associated with the calculated route extending from the geographic location of the first appointment to the geographic location of the second appointment.

As such, depending on the required travel time, the user may be presented with an option of selecting to travel immediately following the first appointment or just prior to the second appointment. In the absence of sufficient time between the first and second appointments, the user is provided with an alert message at the time of scheduling the first and/or the second appointment, informing the user of the same, as more fully described below with respect to FIGS. 9A-9C. The alert message may be in several forms. In one example, the alert message is in the form of automatic e-mail to the user (or a person to whom the user delegates the task of keeping the user's calendar), informing the user of the conflict. In another example, the alert message is provided as a user interface ("UI") within the calendar application. In either case, the alert message provides the user with several options to allow the user (or a person to whom the user delegates the task of keeping the user's calendar) to account for such a conflict.

For instance, the alert message indicates to the user the anticipated need to leave the first appointment earlier than its scheduled ending time or arriving at the second appointment later than its scheduled starting time. Alternatively, the alert message may provide the user with an option to reschedule the first and/or the second appointment. To this end and as described with respect to FIG. 9C, the calendar application may attempt to identify the availability of the participants of the first appointment and/or the second appointment for rescheduling either of the first and/or second appointments. In this manner, the user is presented with several options to resolve the conflict (e.g., absence of sufficient travel time) between the first and second appointments.

In another implementation described generally with respect to FIG. 5, after taking into the account the travel time associated with the travel route between the first and second appointments, the calendar application identifies that there is an unscheduled time period in the user's calendar, and the calendar application informs the user of the same. Along these lines, the calendar application may provide the user with suggestions as to how the user should fill in the identified gap between the user's first and second appointments. This may help the user to more efficiently manage the unscheduled times within the user's daily calendar.

In one example, the calendar application presents to the user a UI, allowing the user to identify a point of interest at which the user is interested in spending the unscheduled time. In response, the user identifies a point of interest (e.g., a coffee shop or a book store) and a geographic location associated therewith. The geographic location may include a specific address associated with the point of interest. Alternatively, the geographic location may include a geographic area/proximity within which the point of interest should be located. In either case, this implementation allows the user to perform a geographically limited search for a particular point of interest to fill in the identified gap between the user's appointments.

In another implementation described generally with respect to FIGS. 11 and 12A-12D, instead of generating appointment-to-appointment directions and reserving a time block to account for the travel time between appointments after the appointments are scheduled, the calendar application generates appointment-to-appointment directions and reserves a time block to account for the travel time between the appointments at the time of scheduling an appointment. To illustrate, assume that the user has scheduled a first appointment within the user's calendar and the user wishes to schedule a second appointment within the user's calendar. Upon indicating a desire to schedule the second appointment, the calendar notes the proposed time and location of the second appointment.

Thereafter, the calendar application automatically identifies a route extending between the first appointment and the second appointment and identifies the travel time associated with the route. If the travel time exceeds the time gap between the first and second appointments, the calendar application alerts the user of the same before accepting the second appointment at the requested time. As such, the user immediately realizes the conflict (e.g., absence of sufficient travel time between the first and second appointments) and is allowed to schedule the second appointment at another time to avoid such conflict. This minimizes the hassle of later recognizing such conflict and having to reschedule the appointment at that time.

However, if the travel time associated with the route does not exceed the time gap between the two appointments, the calendar application schedules the second appointment at the requested time. Along these lines, if the user now wishes to schedule a third appointment between the first and second appointments, the calendar application first ensures that the proposed timing of the third appointment does not present a conflict (e.g., absence of sufficient travel time between the first and third appointments or between the third and second appointments) before accepting the third appointment.

In particular, the calendar application automatically identifies a first route extending from the geographic location of the first appointment to the geographic location of the third appointment and identifies a first travel time associated with the first route. Similarly, the calendar application automatically identifies a second rout extending from the geographic location of the third appointment to the geographic location of the second appointment and identifies a second travel time associated with the second route. The calendar application then compares the first travel time with the time gap between the first and third appointments and similarly compares the second travel time with the time gap between the third and second appointments.

If the first travel time exceeds the time gap between the first and third appointments or the second travel time exceeds the time gap between the third and the second appointments, the calendar application alerts the user before accepting the third appointment at the requested time. As such, the user immediately realizes the conflict and is made able to schedule the third appointment at another time to avoid such conflict.

Alternatively, if the first travel time does not exceed the time gap between the first and third appointments and the second travel time also does not exceed the time gap between the third and second appointments, the calendar application schedules the third appointment at the requested time.

In some implementations, position of an attendee of an appointment is detected. Based on the position of the attendee, current time/position of the attendee is compared to time/location of a next calendar appointment or invite to identify situations in which the attendee will be late to the appointment. Appropriate action may be taken when it is determined that an attendee likely will be late to the appointment. For instance, techniques may include rescheduling the appointment to a time when the attendee will arrive at the appointment. Dynamic changes to travel time (e.g., changes based on changing travel/road conditions or diverging from a route) for one or more attendees may be accounted in rescheduling appointments.

In addition, time required by incidentals of travel may be accounted when determining whether dynamic changes need to be made to a calendar event to which a traveler is scheduled to attend. Specifically, if an attendee is traveling to an appointment by automobile and the navigation system indicates that the attendee is 10 minutes away from the appointment location for a meeting that begins in 10 minutes, the attendee may be late given the need to park, walk from the car to the meeting, and clear security. Keywords such as airport/ train/flight/car/security, and distances, may each help to recognize modalities of travel and appropriately account for incidental time required thereby.

FIGS. 1A and 1B illustrate exemplary calendar application interfaces, allowing a user of the calendar application to identify a travel route extending from a geographic location of a first appointment to a geographic location of a second appointment and to reserve, within the calendar application, a time block for a travel time associated with the travel route. The user interfaces ("UIs") of FIGS. 1A and 1B are generally similar. For ease of description, the implementation of FIG. 1A is discussed in detail, and a description of redundant aspects of the implementation of FIG. 1B is omitted for brevity.

FIG. 1A illustrates an exemplary UI 100A used for identifying a travel route between multiple appointments and reserving, within a calendar application, a time block for a travel time associated with the travel route. In particular, the UI 100A includes a calendar application interface 110. The calendar application interface 110 identifies, within a particular day (e.g., Monday, Apr. 23, 2002), a first appointment 115, a second appointment 120, and a control icon 125. As shown, the first appointment 115 is with "patent attorney Karl Renner at 1425 K Street, NW, Washington D.C. 20005." And, the first appointment 115 is from 10:00 am to 11:00 am. The second appointment 120 is with "patent examiner Joe Smith at the U.S. Patent and Trademark Office." And, the second appointment 120 is from 1:00 pm to 2:00 pm.

The calendar application interface 110 also includes the control icon 125. The control icon 125 is structured and arranged for identifying a travel route extending from a geographic location of the first appointment 115 to the geographic location of the second appointment 120 and for reserving a time block, within a calendar application, to account for the travel time associated with the travel route. To this end, the selection of the control icon 116 prompts the calendar application to (1) identify a route extending from the geographic location of the first appointment 115 to the geographic location of the second appointment 120, (2) identify a travel time associated with the route, and (3) reserve a time block within the calendar application to account for the travel time, as more fully described below with respect to FIGS. 1B and 2.

FIG. 1B illustrates the calendar application interface 110 with the control icon 125 being activated. As shown, the selection of the control icon 125 prompts the calendar application to reserve a travel time block 130 between the first appointment 115 and the second appointment 120. In one implementation, the selection of the time block 130 provides the user with directions from the geographic location of the first appointment 115 to the geographic location of the second appointment 120.

FIG. 2 illustrates an exemplary process 200 used to identify a travel route between first and second appointments and to reserve, within a calendar application, a time block to account for a travel time associated with the travel route. In keeping with the previous example and for convenience, the calendar application described with respect to FIGS. 1A and 1B is referenced as performing the process 200. In particular, the process 200 involves the calendar application interface 110, the first appointment 115, the second appointment 120, the control icon 125, and the travel time block 130. Although the process 200 is described below as being performed by the calendar application, it should be understood that it can be performed by a navigation application. Alternatively or additionally, some of the actions within the process 200 may be performed by the calendar application and others may be performed by the navigation application. Alternatively or additionally, the process 200 may be performed by an application that acts as an interface between the navigation and calendar applications.

The process 200 includes the calendar application identifying a first appointment in a calendar application (210) and identifying a geographic location of the first appointment (215). To do so, in one implementation, the calendar application references a location field associated with the first appointment 115 to identify the location associated with the first appointment 115. Alternatively or additionally, the calendar application may reference other fields associated with the first appointment 115 and may search for key words identifying an address. For example, the calendar application may search for a zip code, city, and/or state name to identify an address. In keeping with the previous example described with respect to FIGS. 1A and 1B, the calendar application identifies that the geographic location of the first appointment 115 is at "1425 K Street, NW, Washington D.C. 20005."

Similarly, the process 200 includes the calendar application identifying a second appointment in the calendar application (220) and identifying the geographic location of the second appointment (225). Identifying the second appointment may include identifying an existing appointment already scheduled within a calendar application. Alternatively or additionally, identifying the second appointment may include receiving a request to schedule a second appointment within a calendar application. The calendar application uses the above-described techniques to identify the geographic location of the second appointment 120. In doing so, the calendar application realizes that the geographic location of the second appointment 120 is U.S. Patent and Trademark Office without a specific address. As such, the calendar application identifies a need for identifying an address associated with the U.S. Patent and Trademark Office. To this end, the calendar application may use an exemplary process 300A illustrated by FIG. 3A and an exemplary UI 300B illustrated by FIG. 3B to determine the address associated with the U.S. Patent and Trademark Office.

Process 300A begins with determining that the user has not specified an address corresponding to an appointment location (310). To do so, in one implementation, the calendar application searches the calendar application for the address associated with the appointment. For example and as noted above, the calendar application may reference a location field associated with the second appointment 120 to determine the address for the second appointment 120. Alternatively or additionally, the calendar application may reference other fields associated with the second appointment 120 and may search for key words (e.g., a zip code, city, and/or state name) identifying an address. In the absence of such information, the calendar application concludes that the user has not specified an address for the appointment location.

Upon identifying that the user has not specified an address for the appointment location, the calendar application attempts to determine the address associated with the appointment location (320). To do so, the calendar application may solicit the user for such information. In one example, the calendar application presents the UI 300B to the user, which includes an "address" icon, allowing the user to specify an address for the appointment location (e.g., U.S. Patent and Trademark Office). In one example, the selection of the "address" icon launches another UI, allowing the user to specify the address for the appointment. The user may manually enter the address in the UI or may import the address into the UI from the user's profile. For example, the user's profile may include an entry for "U.S. Patent and Trademark Office" that specifies the address for "U.S. Patent and Trademark Office." The profile may include the user's contact/address list. Alternatively, the calendar application may automatically determine the address for the U.S. Patent and Trademark Office without having the user to interact with the UI 300B. For example, the calendar application automatically obtains the address for U.S. Patent and Trademark Office from the user's profile.

Alternatively, the calendar application may access an online resource (e.g., Internet) to perform a web search or a database search to determine the address for the U.S. Patent and Trademark Office. In this manner and in one specific example, after performing the search, the calendar application identifies multiple addresses associated with the appointment.

To ensure the coned address is used, the calendar application may present another UI to the user and may request that the user selects from among the multiple addresses associated with the appointment location. Upon identifying the address, the calendar application allows the user to obtain directions to the appointment location (320). To this end, the calendar application includes a directions/mapping selection portion 325 in the UI 300B, selection of which provides the user with directions and/or maps to the geographic location of the second appointment 120 from the geographic location of the first appointment 115.

Along these lines, the process 200 includes the calendar application identifying a route extending from the geographic location of the first appointment to the geographic location of the second appointment (230). To do so, in one implementation, the calendar application has a built in navigation component, allowing it to generate directions from the geographic location of the first appointment 115 to the geographic location of the second appointment 120. In another implementation and as noted above, the calendar application communicates the location information for each appointment to a navigation application that is physically or logically distinct from the calendar application and requests, from the navigation application, that it identifies the travel route and the travel time associated therewith. The U.S. patent application Ser. No. 11/618,069, filed on Dec. 29, 2006 and entitled "Communicating Appointment And/Or Mapping Information Among A Calendar Application And A Navigation Application," describes in detail concepts that effect communications of appointment information from a calendar application to a navigation application for generating a travel route and a travel time associated therewith. The entire content of this application is incorporated herein by reference.

After identifying the travel route, the calendar application identifies a travel time associated with the route (235). The travel time may take into account the current road conditions and it may be updated as the current road conditions changes, as described in more detail below with respect to FIGS. 8A and 8B. Alternatively or additionally, the travel time may take into account the historic traffic flow.

Moving forward, the calendar application determines an amount of unscheduled time between the first and second appointments (240) to determine whether the amount of unscheduled time can sustain the travel time. To do so, in one implementation, the calendar application uses an exemplary process 400 illustrated by FIG. 4.

Figure 4:
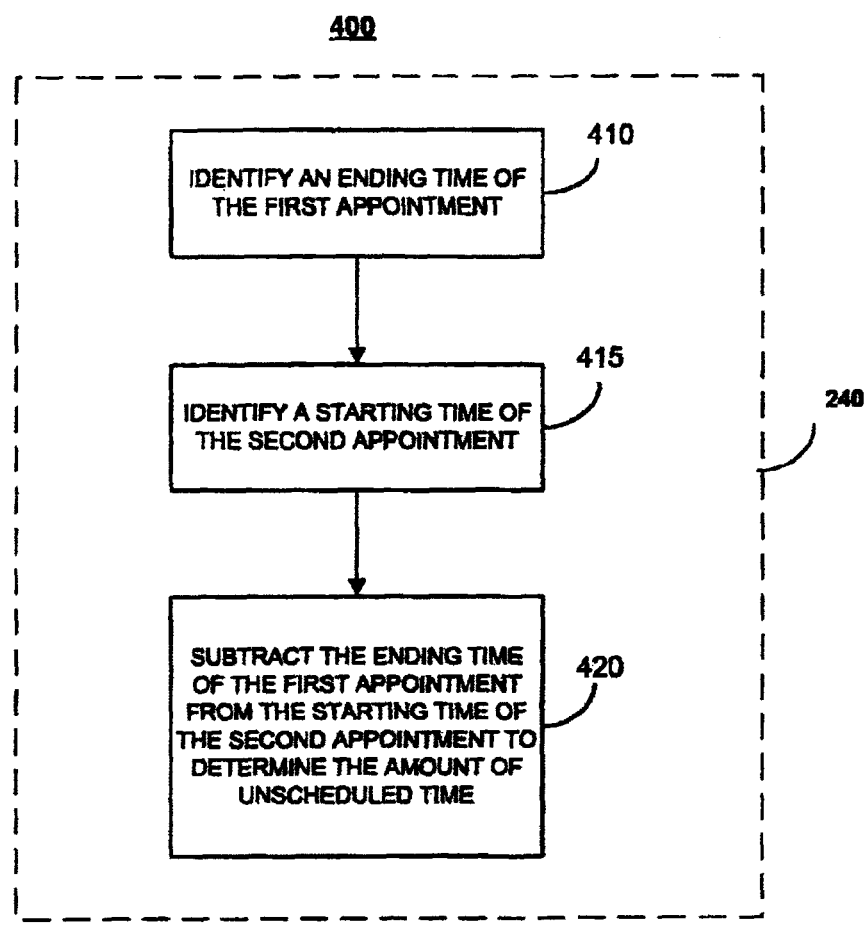
FIG. 4 illustrates an exemplary process for identifying an amount of unscheduled time between two appointments (e.g., a first appointment and a second appointment).

FIG. 4 illustrates an exemplary process 400 for identifying an amount of unscheduled time between two appointments (e.g., the first appointment and the second appointment). The process 400 includes the calendar application identifying an ending time of the first appointment (410) and identifying a starting time of the second appointment (415). To do so, in one implementation, the calendar application references a time field within the calendar application to identify the time during which the appointment is scheduled to take place. Alternatively or additionally, the calendar application may reference other fields associated with the first and second appointments and may search for key words identifying time of each appointment. For example, the calendar application may search for key words, such as "starting time," "ending time," "from 10:00 am to 11:00 am," and other possible texts indicative of the time of the appointment.

In one scenario, the calendar application determines that the user has failed to identify a start or end time associated with either or both of the first and second appointments. In such scenario, the calendar application may use a UI (not shown) to solicit from the user the time associated with the appointment.

After identifying the ending time associated with the first appointment and the starting time associated with the second appointment, the calendar application subtracts the ending time of the first appointment from the starting time of the second appointment to determine the amount of unscheduled time (420).

After identifying the amount of unscheduled time, the calendar application determines whether the amount of unscheduled time equals or exceeds the travel time (245). If so (250, yes), the calendar application reserves, within the calendar application, a time block to account for the travel time (255).

Upon determining that the amount of unscheduled time exceeds the travel time, in one implementation, the calendar application determines whether the amount of unscheduled time exceeds the travel time by more than a threshold amount. And, if it is determined that the amount of unscheduled time exceeds the travel time by more than the threshold amount, the calendar application provides a message that informs a user of the unscheduled time period. Along these lines, the calendar application also may provide the user with suggestions as to how the user should fill in the identified gap between the user's first and second appointments. This may help the user to more efficiently manage the unscheduled times within the user's daily calendar.

FIG. 5 illustrates an exemplary UI 500 used to inform the user of the unscheduled time in the user's calendar. The user interface 500 alerts the user that "even after taking into account the travel time from the first appointment to the second appointment, there remains an unscheduled time period in [the user's] calendar between the first and second appointments." And, the UI 500 prompts the user to request more information, such as, for example, whether the user wishes to spend more time at the preceding or subsequent appointment, to stop at another place (e.g., a gas station), to start traveling toward the next appointment, or to do "other" activities, such as to go to a coffee shop and/or a grocery store.

In particular, the UI 500 includes an option that allows a user to search for a particular type or point of interest (e.g., a coffee shop) near a user-identified destination. For example, by selecting (e.g., "clicking on") the "destination" link, the UI 500 generates another UI (not shown) that allows the user to specify a geographic location for the coffee shop. In one implementation, the geographic location for the coffee shop includes a specific address. In another implementation, the geographic location includes a parameter/proximity within which the point of interest should be located. For example, the user may draw a geographical designation proximate to or around the travel route, thereby indicating an interest in the point of interest located within the parameter. As such, these options allow the user to perform a more limited geographical search for a particular point of interest.

In another slightly different implementation, after the user identifies the point of interest, the calendar application automatically searches and identifies a geographic location for the point of interest within the vicinity of the travel route extending from the geographic location of the first appointment to the geographic location of the second appointment. Along these lines, the calendar application may provide the user with a UI (not shown) that displays a travel route extending from the geographic location of the first appointment to the geographic location of the second appointment, identifies the geographic locations associated with the point of interest along the route, and requests, from the user, to select, from among the identified geographic locations, a location for the point of interest.

Referring again to FIG. 2, if it is determined that the travel time exceeds the amount of unscheduled time (250, no), the calendar application alerts the user of the conflict and provides the user with one or more suggestions to resolve the conflict. In one example, the calendar application presents to the user a UI, providing one or more suggestions to make able the user to respond to the alert message. The process associated with generating an alert message is more fully described below with respect to FIG. 9A and the UI providing the user with one or more suggestions is more fully described below with respect to FIG. 9B.

In one implementation, the calendar application is configured to allow the user to set a travel time reminder, reminding the user to leave the user's current location at a specified time that precedes the starting time of the appointment by at least the travel time to the appointment. In keeping with the previous example described with respect to FIGS. 1A and 1B, the calendar application is configured to allow the user to set a travel time reminder, reminding the user to leave at a specified time that precedes the starting time (e.g., 1:00 pm) of the second appointment 120 by at least the travel time (e.g., 60 minutes) to the second appointment 120.

Figure 6:
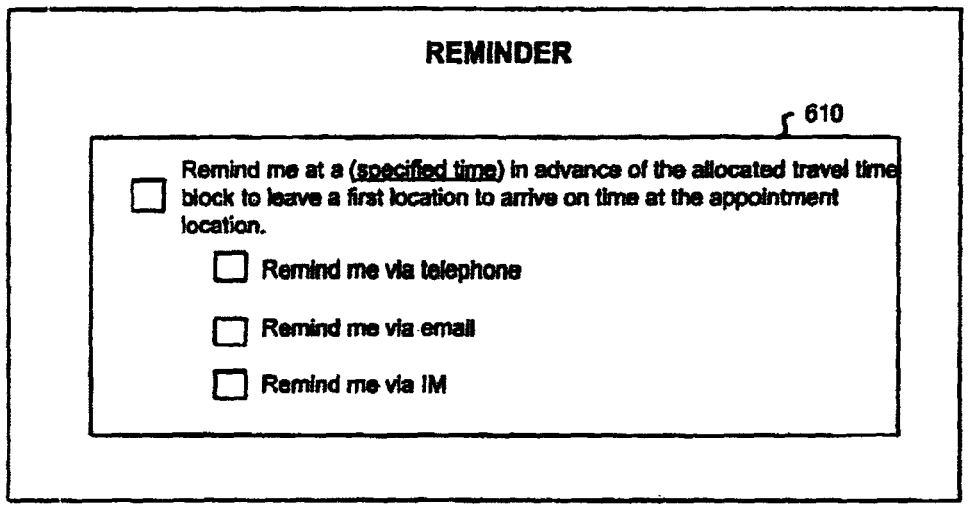
FIG. 6 illustrates an exemplary UI that makes the user able to set a reminder in calendar application.

FIG. 6 illustrates an exemplary UI 600 that makes able the user to set such reminders within a calendar application. The UI 600 includes a reminder selection portion 610. The reminder selection portion 610 includes one or more options selection of which instruct the calendar application to remind the user at a "specified time" in advance of the allocated travel time block to arrive at a geographic location of the second appointment on time. In one example, the user's selection of the reminder selection portion 610 launches another UI (not shown), allowing the user to set the "specified time." For example, the user may request to be reminded about an appointment 10 minutes before the time the user should leave the user's present location to arrive at the appointment location on time. The reminder selection portion 610 also allows the user to specify the manner in which the reminder should be sent to the user. As shown in FIG. 6, the user may choose to receive the reminder via, for example, via an audio call placed to a telephone, an email, an instant message, and/or "other" options, such as short message service ("SMS").

The calendar application may be configured to allow the user to set alert messages, alerting the user about different events. In one specific example, the user may wish to set an alert message, alerting the user if the travel time associated with the calculated route between the first appointment and the second appointment changes due to a change in the current road conditions. In another example, the user may wish to set an alert message, alerting the user about conflicting appointments. In keeping with the previous example, the timing of the first and second appointments that previously did not conflict with each other even after taking into account travel time from the first appointment to the second appointment, may now present a conflict due to the new calculated travel time and the alert message informs the user of the same. In yet another example, the user may set an alert message, alerting the user of an unscheduled within the user's calendar application. In yet another example, the user may set an alert message, providing the user with updated directions and an updated travel time if the user deviates from the previously calculated route.

Figure 7:
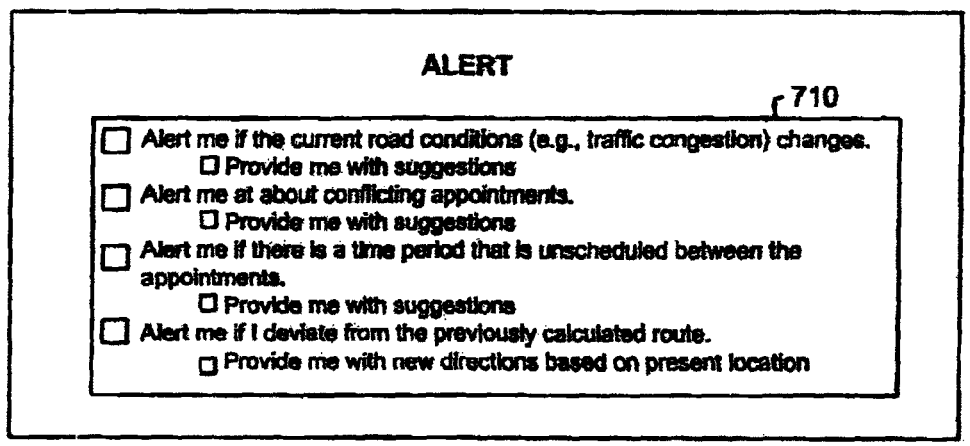
FIG. 7 illustrates an exemplary UI used to allow a user to set an alert message, alerting the user of certain pre-defined conditions/events.

FIG. 7 illustrates an exemplary UI 700 used to allow the user to set an alert message, alerting the user of certain predefined conditions/events. The UI 700 includes an alert selection portion 710. As shown, the alert selection portion 710 includes four user-selectable alert options. The first alert option, described below in more detail with respect to FIGS. 8A and 8B, alerts the user if current road conditions change and may suggest an alternate route to the user that avoids problematic routes associated with the change in the road conditions. The second alert option, described below in more detail with respect to FIGS. 9A-9C, alerts the user about conflicting appointments (e.g., absence of sufficient travel time between the appointments) and may suggest possible options to help the user avoid the conflicting appointments.

The third alert option, described above in more detail with respect to FIG. 5, alerts the user about a time period that is unscheduled between the user's appointments and may suggest an alternate schedule to help the user to more efficiently use the unscheduled time slot. The fourth alert option, described below with respect to FIGS. 10A and 10B, alerts the user if the user deviates from the previously calculated route and provides the user with new directions based on the user's present location. More particularly, the user's selection of the fourth alert option instructs the calendar application to update the calculated route based on real time information, such that a user deviating from the original route may receive an updated route (an updated effect on a calendar of appointments) to the user's next appointment location.

Figure 8A:
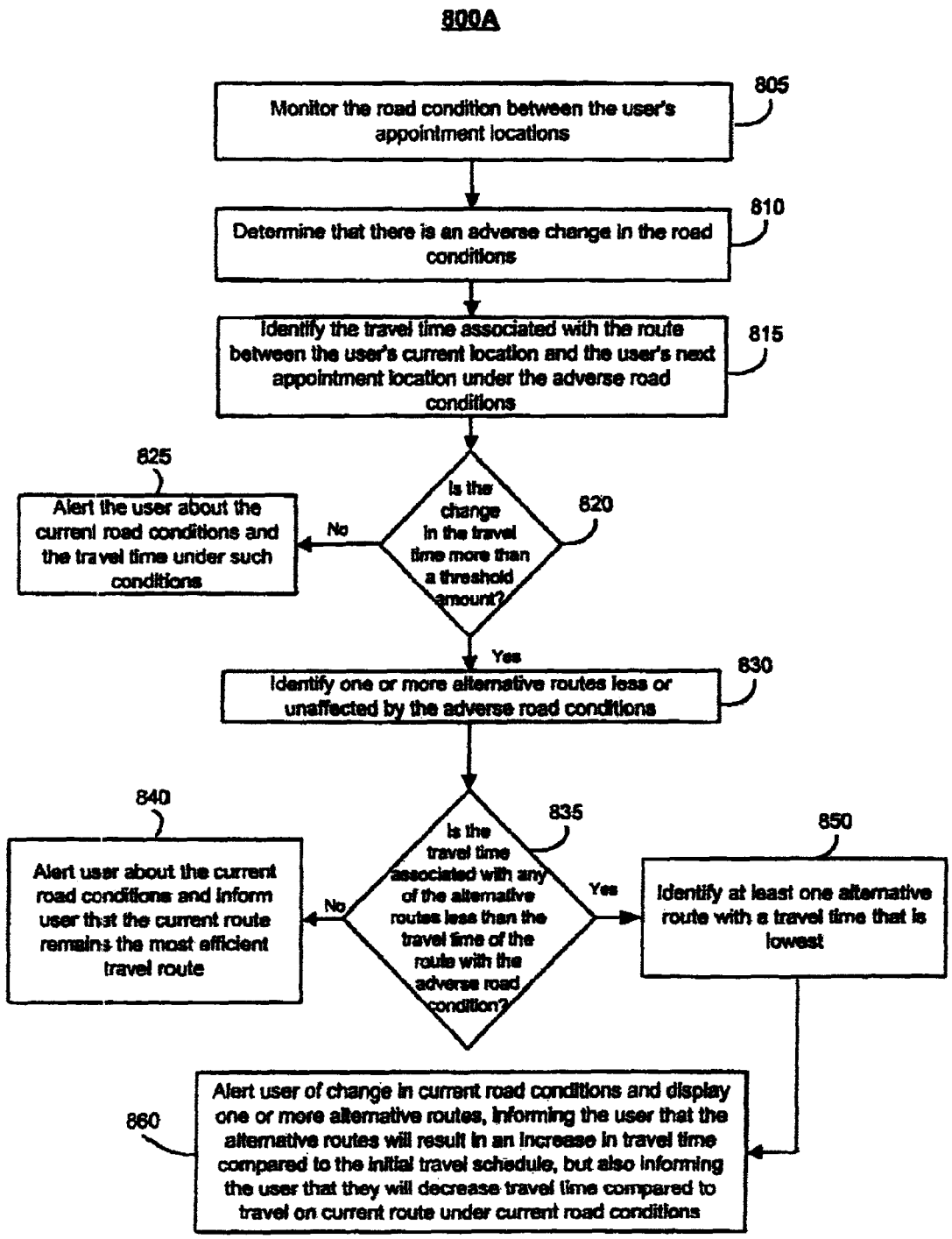
FIG. 8A illustrates an exemplary process used to alert a user about a change in current road conditions.

FIG. 8A illustrates an exemplary process 800A that a calendar application uses to alert a user about a change in current road conditions. In keeping with the previous example and for convenience, the calendar application described with respect to FIGS. 1A and 1B is referenced as performing the process 800A. In particular, the process 800A involves the first appointment 115, the second appointment 120, the control icon 125, and the travel time block 130. Although the process 800A is described below as being performed by the calendar application, it should be understood that it can be performed by a navigation application. Alternatively or additionally, some of the actions within the process 800A may be performed by the calendar application and others may be performed by the navigation application. Alternatively or additionally, the process 800A may be performed by an application that acts as an interface between the navigation and calendar applications.

Moving forward with the calendar application performing the actions of the process 800A, the calendar application may use the process 800A, for example, in response to the user's selection of the first alert option in the alert selection portion 710 illustrated by FIG. 7. Alternatively or additionally, the calendar application may use the process 800A in response to the user's selection of the control icon 125. In either case, the process 800A includes the calendar application monitoring the road conditions between the user's appointment locations (805). For example, the calendar application monitors the road conditions associated with the previously calculated travel route extending from the geographic location of the first appointment 115 to the geographic location of the second appointment 120. To do so, in one implementation, the calendar application regularly contacts a server that includes traffic data to obtain current road conditions between the user's appointments. To minimize the burden on the server initially, the calendar application may contact the server less frequently and, as it gets closer to the time the user has to leave the geographic location of the first appointment 115 to arrive on time at the geographic location of the second appointment 120, the calendar application contacts the server more often to obtain more up to date information.

Regardless, the calendar application determines that there is a change in the road conditions (810). The change in the road conditions may include events such as traffic, accidents, rush hours, construction, road blocks, and/or adverse weather conditions resulting in a slower recommended speed limit. The calendar application identifies the updated travel time associated with the travel route under the current road conditions (815). The calendar application then compares the updated travel time under the changed road conditions with the travel time under normal conditions to determine if they differ by more than a threshold amount (820). For example, the calendar application compares the updated travel time with the travel time specified in the travel time block 130. If they do not differ by more than the threshold amount (820, no), the calendar application alerts the user about the current road conditions and the updated travel time under such conditions (825). In one example, the calendar application updates the travel time block 130, within the calendar application interface 110, to account for the updated travel time. If the change in travel time is more than the threshold amount (820, yes), the calendar application identifies one or more alternative routes that are less or unaffected by the adverse road conditions and the travel time associated therewith (830). In another implementation, the calendar application informs the user of the adverse condition and solicits from the user as to whether the user wishes to identify an alternative route. Upon receiving an indication from the user that the user wishes to identify an alternative route, the calendar application identifies one or more alternative routes or determines that an alternative route that is less or unaffected by the adverse road conditions does not exist.

To identify an alternative route, the calendar application attempts to find a route that avoids the adverse events (e.g., accidents) resulting in the change in the road conditions for the previously calculated route. The calendar application checks to determine whether the travel time associated with any of the alternative routes is less than the travel time associated with the route with the adverse conditions (835). If not (835, no), the calendar application alerts the user about the current road conditions and informs the user that their current route remains the most efficient travel route (825).

If the travel time associated with any of the alternative routes is less than the travel time associated with the original route facing the adverse road condition (835, yes), the calendar application identifies at least one alternative route with a travel time that is lowest (e.g., a route with the least travel time). The calendar application may identify the at least one alternative route with a travel time that is lowest by comparing the travel times of the identified alternative routes and selecting from among the identified alternative routes, the alternative route with the lowest travel time. The calendar application may select more than one alternative route when two routes have the same travel time that is also the lowest travel time or when the calendar application is configured to present options to the user by selecting multiple routes (e.g., the two alternative routes, from among the identified alternative routes, with the two lowest travel times). In response to identifying the at least one alternative route with a travel time that is lowest, the calendar application alerts the user of the change in the current road conditions and displays to the user the one or more identified alternative routes, informing the user that the alternative routes will result in an increase in travel time compared to the initial travel schedule, but also informing the user that they will decrease travel time compared to travel time on the current route under the current road conditions (860).

To alert the user, the calendar application may display to the user a UI informing the user of the time, present location, and the adverse condition, and suggesting that the user takes a different route to the user's next appointment location. Alternatively or additionally, the calendar application may store the directions associated with the new route in the travel time block 130 for later access by the user and may update the travel time associated with the new route.

FIG. 8B illustrates an exemplary UI 800B the calendar application uses to alert a user about a change in current road conditions. The UI 800B informs the user of the present time (e.g., 11:00 am), the user's present location (e.g., the first appointment location), and the user's next destination (e.g., the second appointment location). As shown in FIG. 8B, the UI 800B also informs the user that if the user were able to travel under normal conditions, the user could expect to arrive at the second appointment location in 60 minutes. However, problematic conditions adversely affect the ability of the user to achieve that estimated travel time. In particular, the alert message indicates that "[t]here is heavy traffic due to an accident on the I-60" and now it will take the user 3 hours to arrive at the second appointment location.

In one implementation, to estimate the new travel time, the calendar application compares the travel time of the original route under the current road conditions with the travel time of an alternative route and suggests to the user the route with the minimum travel time. For example and as shown in FIG. 8B, the calendar application determines the alternative route has the minimum travel time (e.g., 2 hours) and suggests taking the alternative route. The calendar application also communicates to the user to leave immediately lithe user wishes to arrive at the second appointment location on time. The UI 800B also makes able the user to view the alternative route via, for example, selecting the "view" icon. Alternatively or additionally, the user can view the alternative route via, for example, selecting the travel time block 130. It is to be understood that other alternative may be presented to the user. For example, the user may be presented with an option to postpone and/or cancel the second appointment and inform the participants of the second appointment of the same.

Figure 9A:
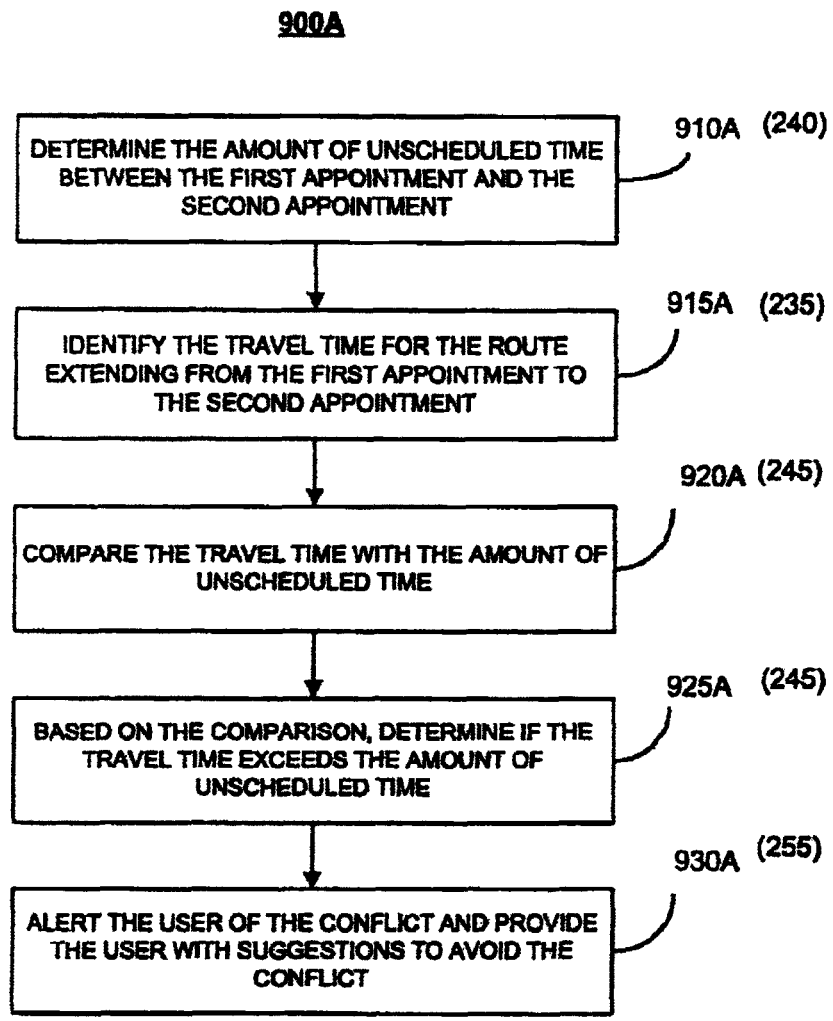
FIG. 9A illustrates an exemplary process used to alert a user about conflicting appointments.

FIG. 9A illustrates an exemplary process 900A used for generating an alert message informing the user of conflicting appointments. The actions performed by the process 900A are similar to some of the actions performed by the process 200 illustrated by FIG. 2. In keeping with the previous example and for convenience, the calendar application described with respect to FIGS. 1A and 1B is referenced as performing the process 900A. In particular, the process 900A involves the first appointment 115, the second appointment 120, the control icon 125, and the travel time block 130. Although the process 900A is described below as being performed by the calendar application, it should be understood that it can be performed by a navigation application. Alternatively or additionally, some of the actions within the process 900A may be performed by the calendar application and others may be performed by the navigation application. Alternatively or additionally, the process 900A may be performed by an application that acts as an interface between the navigation and calendar applications.

The process 900A may be used, for example, in response to the user's selection of the control icon 125. Alternatively or additionally, the process 900A may be used, for example, in response to the user's selection of the second alert option in the alert selection portion 710 illustrated by FIG. 7. In either case, the process 900A includes the calendar application determining the amount of unscheduled time between the first appointment 115 and the second appointment 120 (910A). The action (910A) is similar to action (240). To this end and as more fully described above with respect to process 400 illustrated by FIG. 4, the calendar application identifies that the amount of unscheduled time is about 2 hours. The calendar application then identifies the travel time for the route extending from the geographic location of the first appointment 115 to the geographic location of the second appointment 120 (915A). The action (915A) is similar to action (235). For example, the calendar application identifies that the travel time is 2 hours and 30 minutes.

The calendar application then compares the travel time with the amount of unscheduled time (920A) and based on the comparison, determines if the travel time exceeds the amount of unscheduled time (925A). The actions (920A) and (925A) illustrate action (245) in more detail. In keeping with the above-described example, the calendar application identifies that the travel time exceeds the amount of unscheduled time by 30 minutes. Accordingly, the calendar application alerts the user of the conflict and provides the user with suggestions to avoid the conflict (930A). The action (930A) is similar to action (255). For example, the suggestions include ending the first appointment 115 sooner than the scheduled ending time and/or canceling or rescheduling the first or the second appointment 115, 120. The alert and the suggestions may be presented to the user via a UI.

FIG. 9B illustrates an exemplary UI 900B used to alert a user about conflicting appointments. The UI 900B may be presented to the user automatically as a part of a regular morning update schedule, alerting the user if there are conflicting appointments in the user's calendar. Alternatively or additionally, the UI 900B may be presented to the user at the time the user selects (e.g., clicks on) the control icon 125. The UI 900B notes that the first appointment at 10:00 am is supposed to last for 60 minutes and the second appointment is at 12:00 pm. The UI 900B also notes that "it takes 120 minutes to arrive at the second appointment location from the first appointment location plus an approximate 10 minutes to get from the car to the meeting."

The UI 900B displays to the user several options to address this conflict. The first option allows the user to spend less time at the first appointment. The second option allows the user to cancel or reschedule the "second appointment". The third option informs the calendar application of the user's preference to arrive late to the second appointment. Other attendees then may be notified that the user will be arriving late. The UI 900B may be interactive, such that the user is allowed to cancel or reschedule another appointment instead of the second appointment. For example, the user's selection of the "second appointment," launches another UI (not shown), allowing the user to select an appointment to be canceled or rescheduled.

Figure 9C:
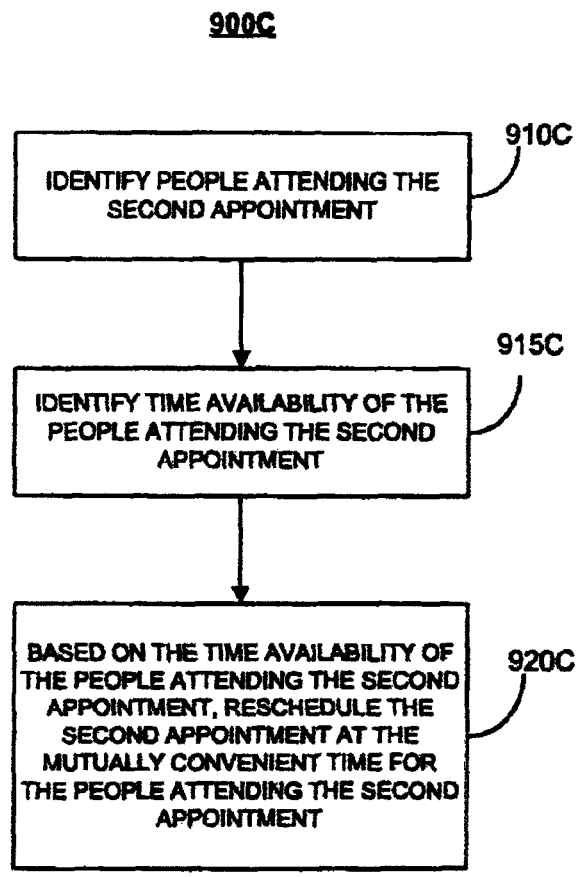
FIG. 9C illustrates an exemplary process used for rescheduling an appointment at a mutually convenient time for the people attending the appointment.

Upon identifying that the user wishes to reschedule the second appointment 120, the calendar application may identify the participants of the second appointment 120 and their time availability to reschedule the second appointment 120 at a mutually convenient time for the participants of the second appointment 120. FIG. 9C illustrates an exemplary process 900C used for rescheduling the appointment 120 at a mutually convenient time for the people attending the appointment 120.

Process 900C includes the calendar application identifying participants of the second appointment 120 (910C). In one example, the calendar application searches participant field to identify the participants of the second appointment 120. After identifying the participants, the calendar application identifies time availability of each of them (915C). To do so, in one implementation, the calendar application remotely accesses, over a wireless network, a calendar application of each of the participants to identify their time availability. In another implementation, the calendar application sends an e-mail to each of the participants and requests from each of them to identify his/her time availability. In either case, based on the time availability of the participants, the calendar application reschedules the second appointment 120 at the mutually convenient time for the participants of the second appointment 120 (920C) and informs the participants of the same.

Figure 10A:
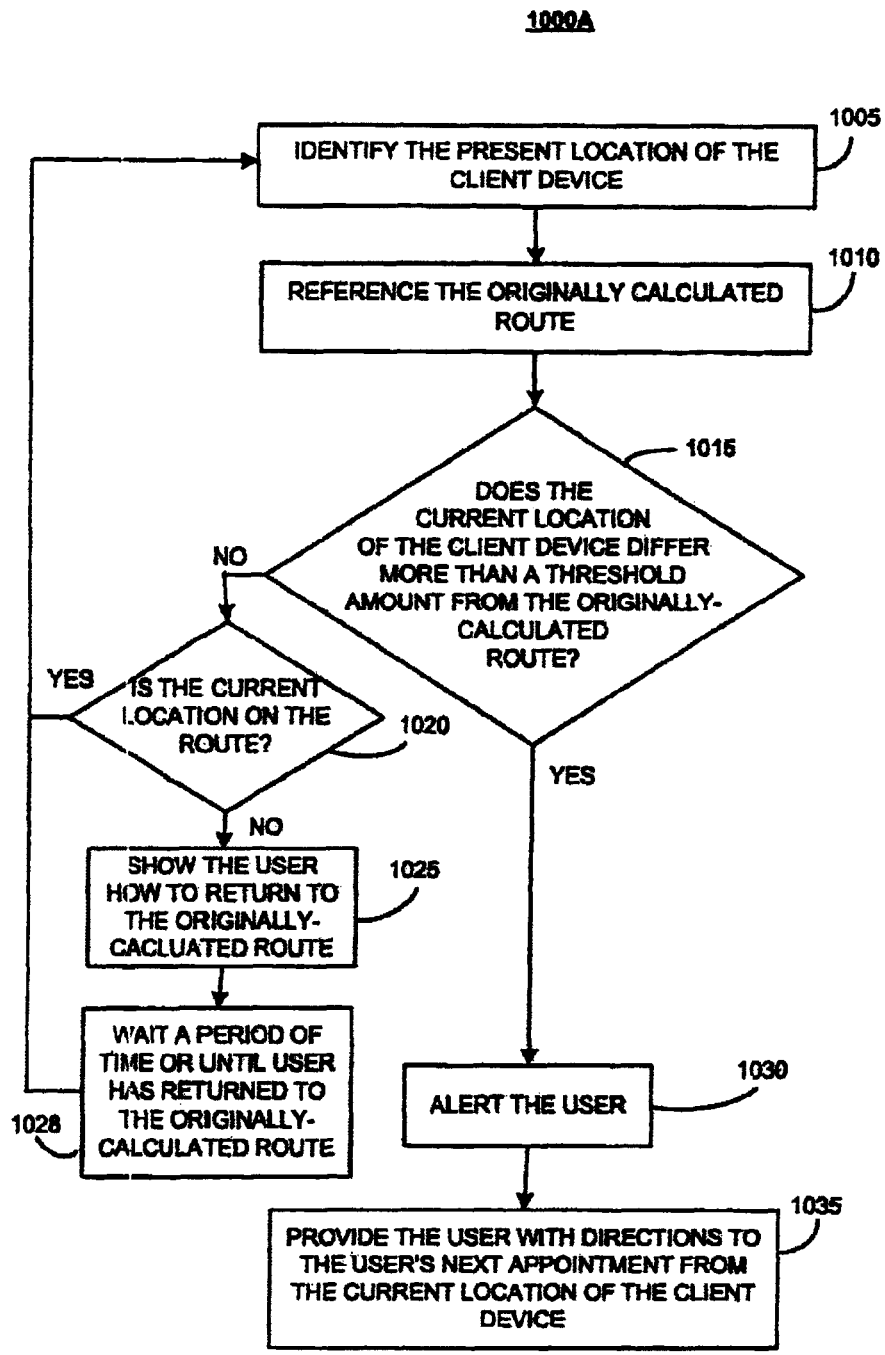
FIG. 10A illustrates an exemplary process used to alert a user that the user has deviated from an original route.

FIG. 10A illustrates an exemplary process 1000A used to alert a user that the user has deviated from an original route. In keeping with the previous example and for convenience, the calendar application described with respect to FIGS. 1A and 1B is referenced as performing the process 1000A. In particular, the process 1000A involves the first appointment 115, the second appointment 120, the control icon 125, and the travel time block 130. Although the process 1000A is described below as being performed by the calendar application, it should be understood that it can be performed by a navigation application. Alternatively or additionally, some of the actions within the process 1000A may be performed by the calendar application and others may be performed by the navigation application. Alternatively or additionally, the process 1000A may be performed by an application that acts as an interface between the navigation and calendar applications.

The process 1000A may be used, for example, in response to the user's selection of the fourth alert option in the alert selection portion 710 illustrated by FIG. 7. Alternatively or additionally, the process 1000A may be used, for example, in response to the user's selection of the control icon 125. In either case, the process 1000A includes the calendar application, including a navigation component, identifying the present location of the client device. In one implementation, the calendar application automatically determines the present location of the user using location providing technology implemented in the user's client device. If the client device is equipped with multiple location providing technologies, the calendar application may use the technology that provides the most accurate information about the present location.

In one example, the client device includes a mobile device that is GPS-enabled, and the calendar application automatically determines the present location of the user based on the GPS position of the client device. In another example, the present location of the user is automatically determined by registering the client device with a host (e.g., a Session Initiation Protocol ("SIP")) server. The client device may provide information to the host that is used to derive location information. For example, the host may derive location information based on how the client device is accessing the network (e.g., as identified by source IP address or another packet identifier).

In yet another alternative, the present location of the user is automatically determined from the user's profile. For example, the user has associated profile or contact information indicating a predetermined home and/or office location. In one specific example, the user of a client office computer has previously stored the location of the user's office in the user's profile. Thus, the navigation application uses the user's profile to determine the office location.

Figure 10C:
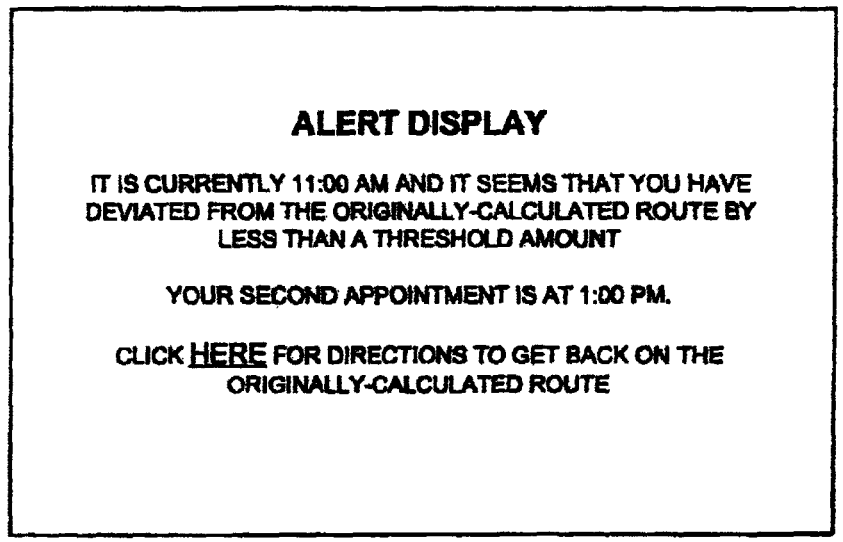
FIG. 10C illustrates an exemplary user interface used to alert a user that the user has deviated from an originally-calculated route by less than a threshold amount and to help the user to get back on the originally-calculated route.

Upon determining the current location, the calendar application references the originally calculated route (1010) and checks to determine whether the current location of the user differs more than a threshold amount from the originally-calculated route (1015). If not (1015, no), the calendar application checks to determine whether the current location is on the route (1020) and if so (1020, yes), the calendar application continues to monitor the current location of the user to account for the possible departure of the user from the route. If, however, the current location of the user is not on the route (1020, no), the calendar application shows the user how to return to the originally-calculated route (1025). FIG. 10C illustrates a UI 1000C that may be used to help the user to return to the originally-calculated route. After showing the user how to return to the originally-calculated route, the calendar application waits a period of time (e.g., a predetermined and configurable period of time, a time determined based on the distance from the originally-calculated route, etc.) or until the user has returned to the originally-calculated route, and continues to monitor the current location of the user to account for departure of the user from the originally-calculated route (1028).

If the current location of the user does differ more than a threshold amount from the originally-calculated route (1015, yes), the calendar application alerts the user (1030). In one example, the threshold is 1 mile from the originally calculated route. If the current location of the client device differs more than the threshold amount from the originally calculated route, the calendar application alerts the user (1030) and provides the user with directions to the user's next appointment location from the current location of the client device (1035). Although FIG. 10A illustrates that actions (1030 and 1035) are performed serially, it is possible that actions (1030 and 1035) can be performed simultaneously.

The calendar application may use a UI, such as the one shown in FIG. 10B, to alert the user and provide the user with updated directions. As described further below with respect to FIG. 10B, the alert message also informs the user of the time and location of the user's next appointment and the travel time to the next appointment location based on the user's present location.

FIG. 10B illustrates an exemplary UI 1000B used to alert a user that the user has deviated from an original route. In particular, the alert message notes to the user that "it is currently 11:00 am, and it seems you have deviated from the original route. You are presently located at 1100 F St., NW, Washington D.C. 20005."

The alert message also informs the user of the time and location of the user's next appointment (e.g., the second appointment 120) and the travel time (e.g., 30 minutes) to the next appointment location based on the present location of the user. The alert message also allows the user to view directions from the present location to the next appointment. In one implementation, the calendar application determines whether the user arrives on time at the user's next appointment based on the new travel time and informs the user in either case. If the user is going to be late to the appointment based on the new travel time, the calendar application may present the user with one or more suggestions to avoid such conflict. For example, the calendar application may present the user with options similar to those described with respect to FIG. 9B.

FIG. 10C illustrates an exemplary UI 1000C used to alert the user that the user has deviated from the originally-calculated route by less than a threshold amount and helps the user to get back on the originally-calculated route. In particular, the alert message notes to the user that "it is currently 11:00 am, and it seems you have deviated from the originally calculated route by less than a threshold amount." In keeping with the example described with respect to FIG. 10A, the user who is presented with the UI 1000C may have deviated from the route by less than a threshold amount (e.g., 1 mile). Regardless, the alert message 1000C allows the user to view directions in order to get back on the originally-calculated route.

Other implementations are also contemplated. For example, instead of or in addition to allowing the user to a reserve, within a calendar application, a time block for the travel time between multiple appointments after the multiple appointments have already been scheduled, as described with respect to FIG. 2, the user is allowed to reserve, within the calendar application, a time block for such travel time during scheduling of an appointment. As such, in this implementation, the user immediately realizes the conflict (e.g., absence of sufficient travel time between appointments) at the time of scheduling an appointment, and the user is allowed to schedule the appointment at another time to avoid such conflict. This minimizes the hassle of later recognizing such conflict and having to reschedule the already scheduled appointment at that time.

Figure 11:
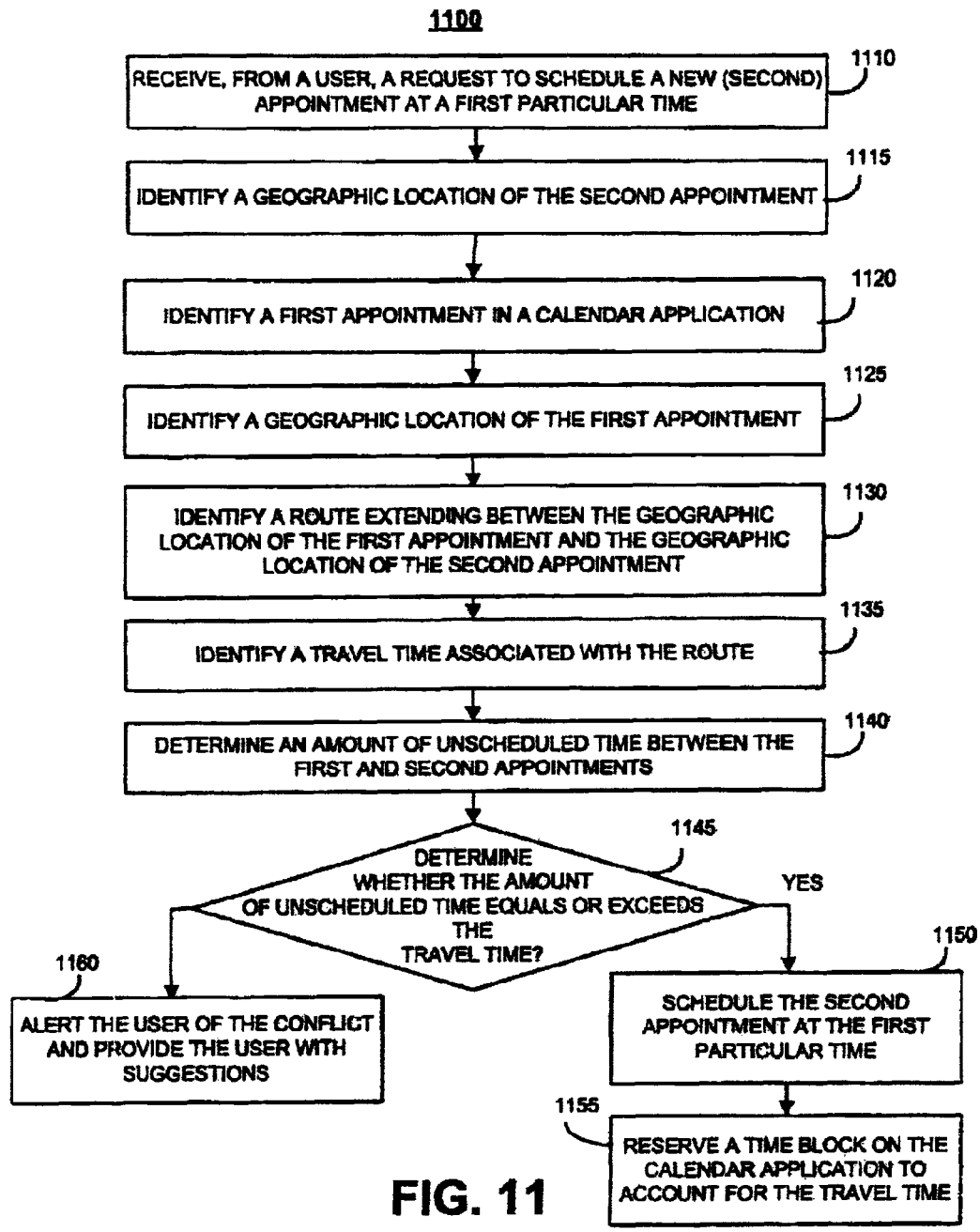
FIG. 11 illustrates an exemplary process used to make able a user to determine presence or absence of a conflict (e.g., absence of sufficient travel time) between an already scheduled first appointment and a second and new appointment that the user wishes to schedule at a particular time.

FIG. 11 illustrates an exemplary process 1100 used to make able a user to determine presence or absence of a conflict (e.g., absence of sufficient travel time) between an already scheduled first appointment and a second and new appointment that the user wishes to schedule at a particular time. In keeping with the previous example and for convenience, the calendar application described with respect to FIGS. 1A and 1B is referenced as performing the process 1100. In particular, the process 1100 involves the calendar application interface 110, the first appointment 115, the second appointment 120, the control icon 125, and the travel time block 130.

Although the process 1100 is described below as being performed by the calendar application, it should be understood that it can be performed by a navigation application. Alternatively or additionally, some of the actions within the process 1100 may be performed by the calendar application and others may be performed by the navigation application. Alternatively or additionally, the process 1100 may be performed by an application that acts as an interface between the navigation and calendar applications.

The process 1100 includes many of the actions described with respect to the process 200. As such, for the sake brevity, only the actions that are different is described here in more detail. These actions include actions (1110, 1150, 1155, and 1160). To illustrate, the process 1100 includes the calendar application receiving, from a user, a request to schedule, within a calendar application, a new (second) appointment 120 at a particular time (1110). To formulate such a request, in one implementation, the user clicks on the time windows appearing on the calendar application interface 1110. This results in generation of a similar to the one shown and described below with respect to FIG. 12C, soliciting, from the user, to specify the time, date, subject, and location of the second appointment 120. After identifying this information, the user may save the second appointment 120 within the calendar application by selecting the "save and close" icon.

Before saving the second appointment 120 into the calendar application, however, the calendar application may first determine whether the proposed second appointment present a conflict (e.g., absence of sufficient travel time) with an already scheduled first appointment 115. If not (1145, yes), the calendar application schedules the second appointment 120 at the proposed particular time (1150). Additionally, the calendar application also reserves a travel time block within the calendar application to account for the travel time (1155). In one implementation, the calendar application places the travel time block immediately before the starting time of the second appointment. In another implementation, the calendar application places the travel time block immediately after the ending time of the first appointment. In yet another implementation, the calendar application presents to a user a UI (not shown), allowing the user to select where the time block should be located between the first and second appointments. In either case, the user may have the option of removing and/or adjusting the travel time block placed between the first and second appointments.

However, if it is determined that the amount of travel time exceeds the amount of unscheduled time (1145, no), the calendar application alerts the user of the conflict and provides the user with suggestions before or at the time of saving the second appointment 120 into the calendar application at the particular time (1160). In one example, the calendar application presents to the user a UI, providing the user with one or more suggestions in, resolving the conflict, as described above in more detail with respect to FIGS. 9A-9C. In response, the user may simply select to schedule the second appointment at another time that does not present such a conflict.

Figure 12A:
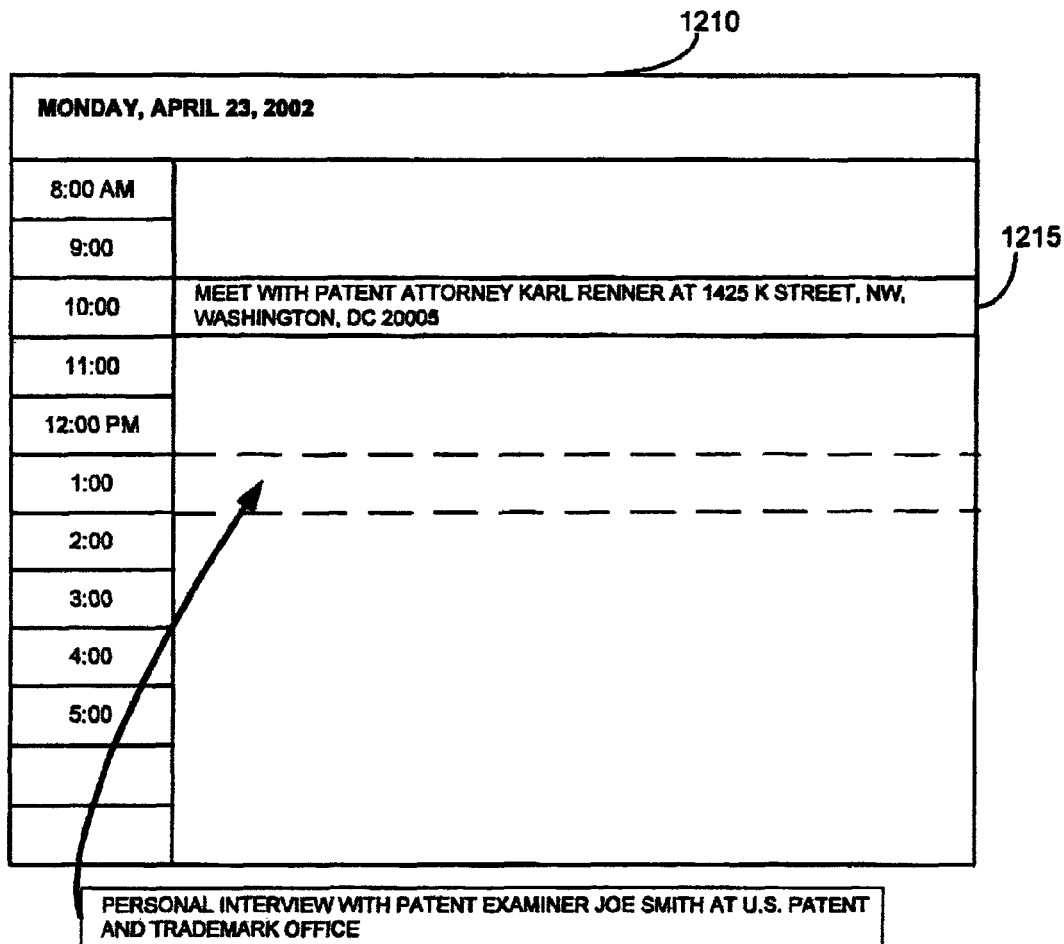

FIGS. 12A-12D illustrate, within the UIs 1200A-1200D, an exemplary sequence of interactions between a calendar application and a user wishing to schedule an appointment using the process 1100 described with respect to FIG. 11. FIG. 12A illustrates an exemplary UI 1200A enabling a user to perceive, within the calendar application, an already scheduled appointment and to schedule a new appointment in the absence of a conflict (e.g., absence of sufficient travel time) between the already scheduled appointment and the new appointment.

The UI 1200A includes a calendar application interface 1210. The calendar application interface 1210 includes, within a particular day (e.g., Monday, Apr. 23, 2002), an already scheduled first appointment 1215. As shown, the first appointment 1215 is with "patent attorney Karl Renner at 1425 K Street, NW, Washington D.C. 20005." Thereafter, the calendar application receives, from the user, a request to schedule a second and anew appointment 1220, which appears to be with "a patent examiner Joe Smith at U.S. Patent and Trademark Office." As shown, in one implementation, the request is in the form of drag and drop operation.

In particular, the user drags, from another application and into the calendar application interface 1210, the information about the second appointment 1220 and drops, within the calendar application interface 1210, the information about the second appointment 1220. In one particular example, the user drops this information within a particular time window (e.g., between 1:00 pm to 2:00 pm window). In another implementation described generally with respect to FIG. 12C, instead of using the drag and drop operation, the user simply selects (e.g., clicks on), for example, "new appointment" icon within the calendar application interface 1210 to schedule the second appointment 1220 and provides the calendar application with the information regarding the second appointment 1220.

In either case, after receiving the information about the second appointment 1220 and before or at the time of accepting/scheduling the second appointment 1220, the calendar application uses the exemplary process 1100 to determine whether the proposed timing of the second appointment 1220 presents a conflict (e.g., absence of sufficient travel time) with the already scheduled first appointment 1215. If not, the calendar application schedules the second appointment 1220 within the calendar application interface 1210 and also reserves, within the calendar application interface 1210, a travel time block associated with the travel time of the route extending between the first appointment 1215 and the second appointment 1220, as shown by FIG. 12B.

FIG. 12B illustrates an exemplary UI 1200B with the second appointment 1220 and the travel time block 1230 both scheduled within the calendar application interface 1210. The travel time block 1230 reserves, within the calendar application interface 1210, the identified time window for traveling. As noted above, in addition to reserving a time block to account for the travel time, the travel time block 130 provides the user with directions from the geographic location of the first appointment 1215 to the geographic location of the second appointment 1220.

Figure 12C:
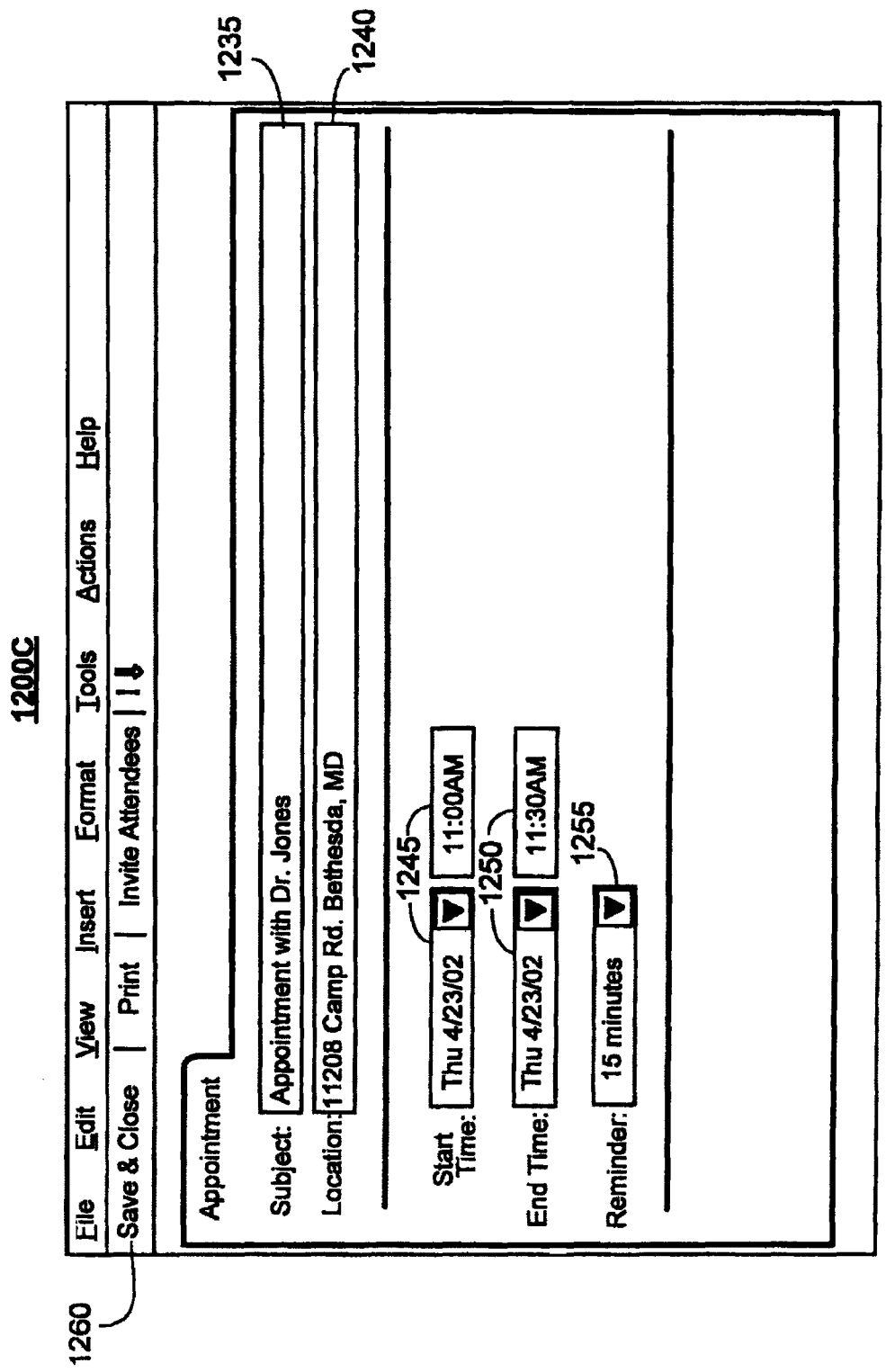

FIG. 12C illustrates an exemplary UI 1200C used to allow the user to schedule a third appointment within the calendar application interface 1210 using the process 1100. In one implementation, the UI 1200C is presented to the user in response to the user selecting (e.g., clicking on) a "new appointment" icon within the calendar application interface 1210. In another implementation, the UI 1200C is presented to the user in response the user selecting (e.g., clicking on) one of the time windows (e.g., 11:00 am to 11:30 am window) appearing within the calendar application interface 1210. In either case, the UI 1200C includes various fields for gathering information about the third appointment. The various fields include a subject field 1235, a location field 1240, a starting time field 1245, an ending time field 1250, and a reminder field 1255.

The subject field 1235 allows the user to identify the subject associated with the third appointment. For example, as shown, the subject associated with the third appointment includes "appointment with Dr. Jones." The location field 1240 allows the user to identifying the geographic location of the third appointment. For example, as shown, the geographic location of the new appointment is at "11208 Camp Rd. Bethesda, Md., 20854." The starting time and ending time fields 1245, 1250, identify the starting date/time and ending date/time associated with the third appointment, respectively. For example, as shown, the starting date/time of the third appointment is on Thursday, Apr. 23, 2002 at 11:00 am and the ending date/time of the third appointment is on Thursday Apr. 23, 2003 at 11:30 am. The reminder field 1255 allows the user to set a reminder for the appointment. For example, as shown, the user has specified a reminder 15 minutes in advance of the appointment time.

To schedule the appointment, the user may click on "save and close" icon 1260. This causes the appointment information to be saved within the calendar application, and the appointment information to be presented on the calendar application interface 1210 between the first and second appointments 1215 and 1220, as shown in FIG. 12D. However, before or at the time of scheduling the third appointment 1265, the calendar application again uses the process 1100 to determine whether the timing of the third appointment 1265 present a conflict (e.g., absence of sufficient travel time) with the already scheduled first and second appointments 1215, 1220.

To this end, the calendar application automatically identifies a first route extending from the geographic location of the first appointment 1215 to the geographic location of the third appointment 1265 and identifies a first travel time associated with the first route. Similarly, the calendar application automatically identifies a second route extending from the geographic location of the third appointment 1265 to the geographic location of the second appointment 1220 and identifies a second travel time associated with the second route. The calendar application then compares the first travel time with the time gap between the first and third appointments 1215, 1265 and similarly compares the second travel time with the time gap between the third and second appointments 1265, 1220.

If the first travel time exceeds the time gap between the first and third appointments 1215, 1265 or the second travel time exceeds the time gap between the third and the second appointments 1265, 1220, the calendar application alerts the user before or at the time of accepting the third appointment 1265 at the requested time. As such, the user immediately realizes the conflict and is permitted to schedule the third appointment 1265 at another time to avoid the conflict. For example, and as shown, the calendar application generates a pop-up window 1270 informing the user of the conflict.

Alternatively, if the first travel time does not exceed the time gap between the first and third appointments 1215, 1265 and the second travel time also does not exceed the time gap between the third and second appointments 1265, 1220, the calendar application schedules the third appointment 1265 at the requested time.

Although FIG. 9B illustrates some of the suggestions that may be offered to the user to avoid the conflict between two appointments, other suggestions also are possible. For example, upon determining that two appointments are conflicting (e.g., there is an absence of sufficient travel time from the first appointment location to the second appointment location), the calendar application may offer to the user to default to a telephone or video conference to avoid the conflict. In keeping with the example described about with respect to FIG. 9B, upon realizing that the amount of unscheduled time between the first appointment and the second appointment is less than the travel time between the two, the calendar application may offer to the user to conduct either the first appointment or the second appointment via telephone.

Along these lines, at a time of scheduling an appointment, the user may be presented with an option to specify whether an appointment is to be conducted via a teleconference or a video conference. If so, the calendar application does not take into account that appointment for purposes of reserving a time block to account for the travel time. To illustrate, assume that the user has three appointments within the user's calendar on a particular day. The first appointment is to be conducted live at 10:00 am, the second appointment is to be conducted via a telephone conference at 11:00 am, and the third appointment is to be conducted live at 12:00 pm. The calendar application realizes that the second appointment is a teleconference or a video conference appointment, and, as such, the calendar application does not reserve a time block for travel time between the first appointment and the second appointment and similarly between the second appointment and the third appointment.

Instead, the calendar application reserves a time block to account for travel time from the first appointment to the third appointment. That is the calendar application intentionally disregards the second appointment for purposes of reserving a time block to account for the travel tame. In one implementation, the user is informed that the travel time between the first and third appointment impinges on the scheduled second appointment that takes place via a teleconference, for example. And, the user is presented with an option to schedule the travel before, during, or after the intervening teleconference appointment.

In a slightly different implementation, instead of the user explicitly specifying that the appointment is a teleconference one, the calendar application infers such conclusion from the information associated with the appointment. In one example, if there is a dial-in number and/or a pin number associated with the appointment and thus, is location independent, the calendar application concludes that the appointment is to be conducted via a telephone, and, as such, does not take into account the appointment for purposes of identifying a travel time. In one implementation, the calendar application confirms with the user as to whether the appointment is indeed to be conducted via a telephone to reduce errors.

Similar to the notion of recognizing and accounting for telephone and/or video conference appointments, the calendar application also may recognize certain keywords (e.g., airports, flights) or locations (e.g., airports) associated with a calendar event, and may have a particular setting to set aside time in addition to the travel time to account for certain routine activities (e.g., going through security). Similarly, the calendar application may set aside time to account for other factors, such as, for example, time needed to get from the car to a meeting. In keeping with the example described above with respect to FIG. 9B, the calendar application notifies the user that the travel time between two appointments is 130 minutes (120 minutes of travel time plus an additional 10 minutes to get from the car to the meeting). As such, the calendar application reserves a time block for 130 to account for the time needed for the user to get from the car to the meeting.

Figure 12E:
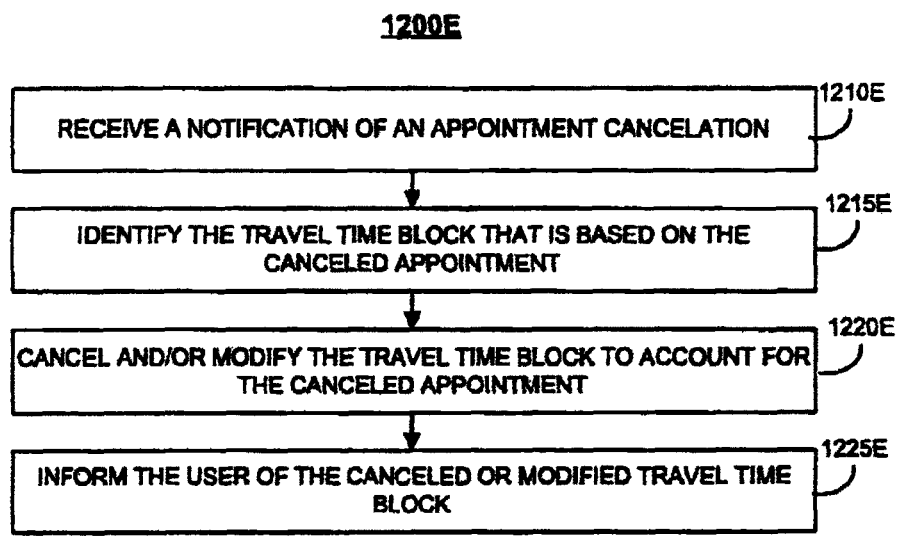
FIG. 12E illustrates an exemplary process used by s a calendar application to cancel and/or modify a travel time block upon receiving an indication from a user to cancel an appointment that is used to estimate the travel time block.

In a another implementation, the calendar application cancels or modifies the already scheduled travel time block upon determining that the user wishes to cancel an appointment used for the estimation of the travel time block. FIG. 12E illustrates an exemplary process 1200E used by the calendar application to cancel and/or modify the travel time block upon receiving an indication from the user to cancel an appointment that is used to estimate the travel time block.

The process 1200E includes receiving a notification of an appointment cancellation (1210E). In keeping with the example described with respect to FIG. 12D, the calendar application may receive a notification that the first appointment 1215 with the patent attorney Karl Renner should be canceled. Upon receiving such an indication, the calendar application identifies the travel time block that is based on the canceled appointment (1215E). Toward this end, the calendar application identifies the travel time block 1230 that is reserved for the travel lime between the first appointment 1215 and the second appointment 1220. And, the calendar application either cancels or modifies the travel time block (1220E).

In one example, if the only remaining appointment is the second appointment 1220, the calendar application cancels the travel time block 1230. However, and as shown in FIG. 12D, if there is a third appointment 1265, the calendar application modifies the travel time block such that it is based on the third appointment 1265. Although, the third appointment 1265 is shown in FIG. 12D to take place after the first appointment 1215, it is to be understood that the third appointment 1265 can take place before the first appointment 1215. In either case, the calendar application identifies the new travel time block and informs the user of the same (1225E).

Other implementations are contemplated. For example, in another general aspect and as described in more detail below with respect to FIG. 13, the concepts described herein also relate to a system that dynamically updates appointment information within a calendar application based on the current location of the user scheduled to participant in an appointment. The system identifies the current location of the user, and based on the current location of the user the system approximates the arrival of the user to the geographic location of the user's next appointment. To do so, the system may take into account the user's modality of travel. The modality of travel may include driving, walking, public transportation, and/or other means of traveling, such as, bicycling. Based on the estimated arrival time, the system may inform the user that the user is running late to the meeting. Similarly, the system may inform other participants of the appointment, thereby saving the remaining participants of waiting for the user.

By way of example, GPS or other location-based information about at least one of the participants in the appointment can be used to automatically (e.g., on the fly) update the appointment in the participant's electronic calendar application (e.g., Microsoft Exchange). To this end, if the participant is 20 minutes walk or drive away from and just underway to an appointment that is due to start now, the appointment can be rescheduled to start in 20 minutes, saving the remaining participants from waiting. In one implementation, to determine the travel time of the participant to the geographic location of the appointment real time traffic and travel data can be leveraged to account for the participant's travel time to a distant meeting. Similarly, this information can be used to alarm the participant as to when he/she needs to depart in order to arrive at the geographic location of the appointment on time.

Figure 18:
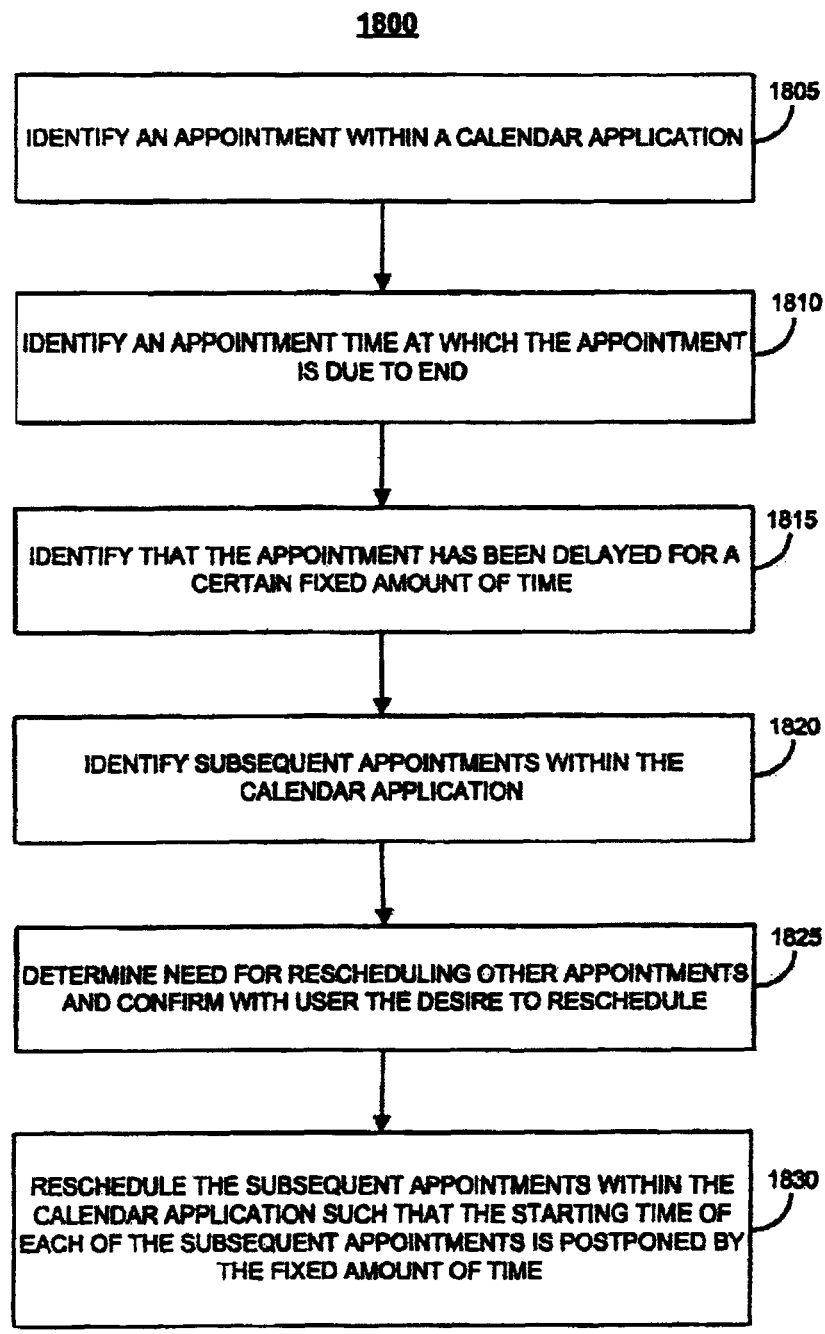
FIG. 18 illustrates an exemplary process used for rescheduling subsequent appointments of a user based on the determination that one of the appointments of the user has been delayed.

In another general aspect and as described in more detail with respect to FIG. 18, the concepts described herein also relate to a system for identifying that a user's appointment has been delayed and dynamically rescheduling the user's subsequent appointments to account for the delay. To illustrate, assume that the doctor is running late to his or her first patient meeting and as such the first appointment that is due to start at 9:00 am and last until 9:15 am actually starts at 9:15 am. The system realizes this delay, identifies subsequent appointments within the doctor's calendar, and automatically reschedules the remaining appointments. For example, the system postpones each appointment by 15 minutes. As such the next appointment that was due to start at 9:15 am and end at 9:30 am will be postponed such that it will start at 9:30 am and end at 9:45 am. The system also may inform other participants of the appointment, thereby saving the remaining participants of waiting for the user. This scenario can be useful in, for example, allowing patients to delay their arrivals at doctor's offices if doctors are running late.

Figure 13:
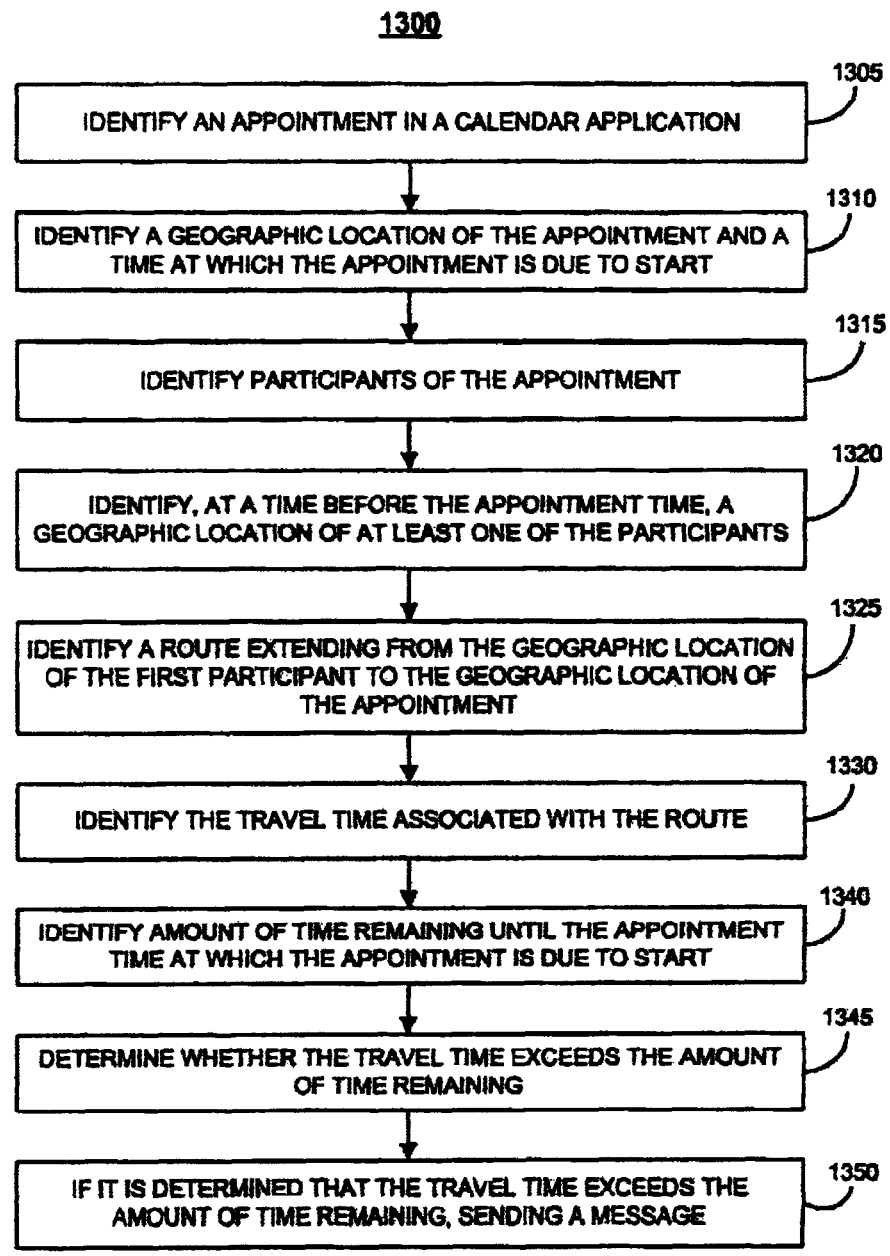
FIG. 13 illustrates an exemplary process used for alerting one or more users who are scheduled to participate in an appointment of possible delay of at least one of the participants to the appointment.

FIG. 13 illustrates an exemplary process 1300 used for alerting one or more users who are scheduled to participate in an appointment of possible delay of the at least one of the participants to the appointment. In keeping with the previous example and for convenience, the calendar application described with respect to FIGS. 1A and 1B is referenced as performing the process 1300. In particular, the process 1300 involves the calendar application interface 110, the first appointment 115, and the second appointment 120.

Although the process 1300 is described below as being performed by the calendar application, it should be understood that it can be performed by a navigation application. Alternatively or additionally, some of the actions within the process 1300 may be performed by the calendar application and others may be performed by the navigation application. Alternatively or additionally, the process 1100 may be performed by an application that acts as an interface between the navigation and calendar applications.

The process 1300 may be activated either manually or automatically. The manual activation may be through a setting (e.g., an icon) appearing in the calendar application or a navigation application. The process 1300 includes the calendar application identifying an appointment within a calendar application (1305) and identifying a geographic location of the appointment and the time at which the appointment is due to start (1310). To identify the geographic location of the appointment, in one implementation, the calendar application references a location field associated with the appointment. Alternatively or additionally, the calendar application may reference other fields associated with the appointment and may search for keywords identifying an address. In one example, the calendar application searches for a zip code, city, and/or state name to identify an address. In this manner, the calendar application identifies that the geographic location of, for example, the first appointment 115 is at "1425 K Street, NW, Washington D.C. 20005."

To identify the time associated with the appointment, in one implementation, the calendar application references a time field within the calendar application to identify the time during which the appointment is scheduled to take place. Alternatively or additionally, the calendar application may reference other fields associated with the appointment and may search for keywords identifying time of each appointment. In one example, the calendar application searches for key words, such as "starting time," "ending time," "from 10:00 am to 11:00 am," and other possible texts indicative of the time of the appointment. In this manner, the calendar application identifies that the time associated with, for example, the first appointment 115 is from "10:00 am to 11:00 am."

The process 1300 also includes the calendar application identifying participants of the appointment (1315). In one example, the calendar application searches participant field to identify the participants of the appointment. To this end, the calendar application identifies at least two participants (e.g., a first participant and a second participant). The first participant may be the owner of the calendar application referenced in FIGS. 1A and 1B, for example.

After identifying the participants of the appointment, the calendar application identifies, at a time before the appointment time, a geographic location of one of the identified participants (1320). For example, the calendar application identifies the geographic location of the first participant (e.g., the owner of the calendar application referenced in FIGS. 1A and 1B).

In some configurations, the calendar application automatically identifies a geographic location of one of the identified participants at a predetermined time before the appointment. For instance, the predetermined time may be immediately preceding the appointment time or may be, for example, fifteen minutes prior to the appointment. The predetermined time may be at a user-specified or a system-specified time in advance of the appointment time. In other configurations, the calendar application identifies a geographic location of one of the identified participants in response to a user requesting the calendar application to identify the geographic location. An administrator, an appointment participant, an organizer of the appointment, or another user related to the appointment may inspire the calendar application to identify the geographic location. For example, a first appointment participant may contact an assistant of a second appointment participant to determine whether the second appointment participant will be attending the appointment in person, by telephone, or whether a need exists to reschedule the appointment. In this example, the assistant of the second appointment participant may inspire the calendar application to identify the geographic location of the second appointment participant to obtain the information requested by the first appointment participant.

In one implementation, the calendar application automatically determines the present location of the first participant using location providing technology implemented in the client device of the first participant. If the client device is equipped with multiple location providing technologies, the calendar application may use the technology that provides the more accurate information about the present location. In one example, the client device includes a mobile device that is GPS-enabled, and the calendar application automatically determines the present location of the first participant based on the GPS position of the client device. In another example, the present location of the first participant is automatically determined by registering the client device with a host (e.g., a Session Initiation Protocol ("SIP") server. The client device may provide information to the host that is used to derive location information. For example, the host may derive location information based on how the client device is accessing the network (e.g., as identified by source IP address or another packet identifier).

In yet another alternative, the present location of the first participant is automatically determined from a profile associated with the first participant. The profile and/or contact information may indicate a predetermined home and/or office location. In one specific example, the user of a client office computer has previously stored in his/her profile the location of the first participant's office. Thus, the calendar application uses the profile to determine the office location.

After identifying the geographic location of the first participant, the calendar application identifies a route extending from the geographic location of the first participant to the geographic location of the appointment (1325). To this end, in one example, the calendar application is equipped with navigation capabilities. Alternatively or additionally, the calendar application communicates with a navigation application that is logically separate from the calendar application to identify the route extending from the geographic location of the first participant to the geographic location of the appointment. As noted above, the U.S. patent application Ser. No. 11/618,069, filed on Dec. 29, 2006 and entitled "Communicating Appointment And/Or Mapping Information Among A Calendar Application And A Navigation Application," describes in detail concepts that effect communications of appointment information from a calendar application to a navigation application for generating a travel route and a travel time associated therewith. Therefore, the manner in which communications between the calendar application and the navigation application takes place is not described here in more detail.

In either case, the calendar application also identifies the travel time associated with the route (1330). For instance, the calendar application may identify a travel time associated with the route by using its own navigation capabilities or by communicating with a navigation application that is logically separate from the calendar application. The calendar application may identify the travel time associated with the route by determining a distance of the route and determining an average travel time corresponding to traveling the determined distance.

The calendar application also may use historical data in identifying the travel time associated with the route. For example, if the participant has previously traveled along the route, the calendar application may use an actual time (or an average of actual times) with which the participant previously traveled the route. The calendar application also may use historical data related to users other than the participant. The calendar application may determine an average time that it took for all known users to travel the route.

In identifying the travel time, the calendar application may consider the time of day, the date, current travel conditions, or any other information that may impact travel time. For example, the calendar application may, when the travel is during rush hour, identify a travel time that is longer than a travel time when the travel is not during rush hour. The calendar application also may identify a travel time that is longer than typical when the calendar application determines that an event (e.g., a parade, a car accident, road work, etc.) is occurring along the route. The calendar application further may account for the modality of travel in identifying the travel time associated with the route.

Figures 14, 15:
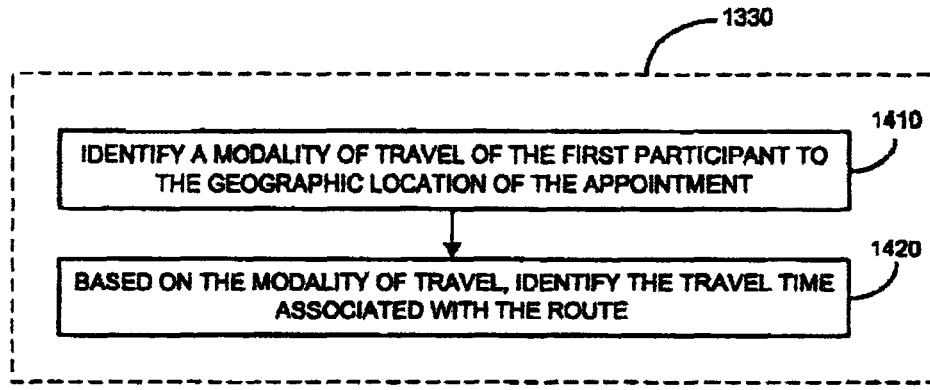
FIG. 14 illustrates an exemplary process for identifying a travel time based on modality of travel.
FIG. 15 illustrates an exemplary UI that is used to solicit, from a participant of an appointment, information regarding a modality of travel.

FIG. 14 illustrates an exemplary process for identifying a travel time based on modality of travel. The calendar application identifies a modality of travel of the participant to the geographic location of the appointment (1410). To do so, in one implementation, the calendar application presents a UI to solicit, from the first participant, such information.

FIG. 15 illustrates an exemplary UI 1500 that is used to solicit, from the participant of the appointment, information regarding the modality of travel. The UI 1500 requests that the first participant specifies or confirms the modality of travel and to this end presents to the user several options. The several options include walking, driving, public transportation, and others. The "others" option may be selected if the first participant's choice of travel does not appear among one of the walking, driving, or public transportation. For example, the user choice of travel may be via a bicycle. To this end, the selection of the "others" option generates another UI allowing the first participant to specify the modality of travel (e.g., a bicycle).

Referring again to FIG. 14, based on the modality of travel, the calendar application identifies travel time associated with the route (1420). In identifying the travel time, the calendar application may take into account the speed of traveling. The speed of traveling may include an average speed based on the specified modality of travel or actual speed of travel. The calendar application may determine that actual speed of traveling by soliciting it from the user or automatically gleaning it from the client device.

To identify the travel time, the calendar application also may take into account traffic conditions. The traffic conditions may include current traffic flow or historic traffic flow. The current traffic flow may be determined by contacting a server that includes traffic data to obtain current road conditions between the user's appointments.

Referring again to FIG. 13, the calendar application also identifies the amount of time remaining until the appointment time at which the appointment is due to start (1340). The time remaining may be determined by identifying a present or current time and subtracting the present or current time from the starting time of the appointment. Unless the present or current time is after the appointment time, the amount of time remaining until the appointment time is a positive number and may be used to determine whether the first participant is likely to arrive at the appointment on time.

Based on the time remaining until the appointment, the calendar application determines whether the travel time exceeds the amount of time remaining until the appointment (1345). For example, the calendar application may compare the travel time to the amount of time remaining until the appointment and determine whether the travel time is greater than the amount of time remaining until the appointment based on the comparison. The calendar application may subtract the travel time from the amount of time remaining until the appointment. If the result is positive, the calendar application determines that the travel time does not exceed the amount of time remaining until the appointment. If the result is negative, the calendar application determines that the travel time does exceed the amount of time remaining until the appointment.

If it is determined that the travel time exceeds the remaining time, the calendar application sends a message (1350). For instance, the calendar application may alert the first participant by displaying an alert display to the first participant that informs the first participant of the same. The calendar application also may send a message to other participants of the appointment indicating that the first participant likely will be late for the appointment. The message may be a reschedule request from the first participant that does not specify the reason that the first participant needs to reschedule the meeting (e.g., that the first participant is running late). The calendar application may send a message to other users that are not participants of the appointment. For example, the calendar application may send a message to the first participant's assistant, a family member of the first participant, participants scheduled to have a subsequent appointment with the first participant after the appointment, etc. In this example, the message may indicate that the first participant may be running late.

FIG. 16 illustrates an exemplary alert interface 1600 used for alerting the first participant that he or she is not likely to arrive at the appointment location on time. In keeping with the previous example and for convenience, the calendar application described with respect to FIGS. 1A and 1B is referenced in describing the alert display 1600.

The alert interface 1600 informs the first participant that it is currently 11:30 am and the first participant is still at the first appointment location (e.g., at "1425 K St. NW, Washington D.C., 20005") and the next appointment of the first participant takes place at noon and is located at United States Patent and Trademark Office. The alert interface 1600 then alerts the first participant that the travel time to the next appointment exceeds the timing remaining until the appointment time. Along these lines, the first participant may be presented with a list of suggestions helping the first participant to avoid such potential conflict.

FIG. 17 illustrates an exemplary alert interface 1700 showing options that are presented to the first participant to avoid the scheduling conflict. The options include (1) sending a message to a second participant informing him or her of the estimated arrival time of the first participant, (2) rescheduling the appointment, and/or (3) changing the modality of travel.

Sending a message to the second participant includes informing the second participant of the geographic location of the first participant and estimated arrival time of the first participant. In this manner, the second participant knows that the first participant is running late and does not have to wait for the first participant at the meeting location and can, for example, delay his/her arrival to the meeting location accordingly. To this end, the second participant may even be directed to reschedule the appointment to account for estimated arrival time of the first participant.

In implementations in which the calendar application sends a message to the other participants, the message may be integrated with the address book or the calendar information to alert other users. For example, a calendar entry for the appointment on a calendar associated with another participant in the appointment may be updated to include the message that the first participant is running late. The message also may be sent to other participants of the appointment by accessing contact information for the other participants using the first participant's address book information and sending the message using the accessed contact information.

The alert interface 1700 also may include telephone numbers or other contact information for the other participants of the appointment. The first participant may view the telephone numbers or other contact information and contact the other participants to inform the other participants that the first participant will likely be late for the appointment.

The options also include rescheduling the appointment. Rescheduling the appointment, for example, includes postponing the appointment time to a later time to thereby allow the first participant to timely arrive at the geographic location of the appointment. To reschedule the appointment, in one implementation, the calendar application accesses a calendar application of the second participant to identify the time availability of the second participant, and based on the time availability of the first and second participant the calendar application reschedules the appointment at a mutually convenient time for the first and second participants.

The options for avoiding the conflict also include changing the modality of travel. Selection of this option may result in generation of another UI instructing the first participant to change the current travel mode to a different one. For example, the first participant may be instructed to change the travel mode from public transportation to driving.

In a slightly different implementation, instead of the first participant having to select one of the options presented in the UI 1700, the calendar application automatically selects one of the options based on the user preferences. For example, upon determining that the first participant is running late to the appointment, the calendar application automatically sends a message to the other participants informing them that the first participant is running late along with the estimated arrival time. For another example, upon determining that the first participant is running late to the appointment, the calendar application automatically reschedules the appointment at a convenient time for the attending users. In yet another example, upon determining that the first participant is running late to the appointment, the calendar application automatically informs the first participant to change the modality of travel and/or travel faster using the current modality of travel to timely arrive at the appointment location.

In some implementations, if it is determined that the travel time does not exceed the amount of time remaining until the appointment, further processing may be performed. For example, the calendar application may subtract travel time from the amount of time remaining until the appointment to determine the amount of time by which the first participant should leave to arrive at the appointment on time. The calendar application may compare the amount of time by which the first participant should leave to arrive at the appointment on time to a threshold and, if the amount of time by which the first participant should leave to arrive at the appointment on time is less than the threshold, the calendar application may send a reminder to the first participant to remind the first participant to leave for the appointment. The reminder may include the amount of time by which the first participant should leave to arrive at the appointment on time.

In some implementations, techniques described above with respect to FIG. 13 may be repeated. For instance, the techniques described with respect to FIG. 13 may be periodically repeated as the first participant travels to the appointment. In this example, updated information regarding the first participant's current location and the current time may be used.

In another implementation and as noted above, the concepts described herein also relate to a process for identifying that a user's appointment has been delayed and also for dynamically rescheduling the user's subsequent appointments to account for such a delay. FIG. 18 provides an example of such a process.

FIG. 18 illustrates an exemplary process 1800 used for dynamically rescheduling subsequent appointments of the user (e.g., the first participant) based on the determination that one of the appointments of the user (e.g., the first participant) has been delayed. Some of the actions performed by the process 1800 are similar to the actions performed by the process 1300. As such and for purposes of brevity, these actions are not described here in more detail.

The process 1800 includes the calendar application identifying an appointment within a calendar application (1805) and identifying an appointment time at which the appointment is due to start and due to end (1810). The actions (1805 and 1810) are similar to those (1305 and 1310) described above with respect to the process 1300, and, as such, they are not described here in more detail.

The process 1800 also includes the calendar application identifying that the appointment has been delayed for a certain fixed amount of time (1815). For example, the calendar application identifies that the starting time of the appointment has been delayed due to one of the participants running late to the appointment. Alternatively or additionally, the calendar application may identify that the duration of the appointment has been extended beyond the scheduled ending time by a certain fixed amount of time. For instance, in one implementation, one of the participants of the appointment notifies the calendar application of such delay. In another implementation, the calendar application determines such delay based on the locations of the participants. For example, if the participant appears to still be at the location of the appointment instead of on the road traveling to the next appointment, the calendar application determines that the appointment has lasted longer than previously scheduled.

Along these lines, the calendar application identifies the amount of time the appointment has been delayed and also identifies the subsequent appointments within the calendar application (1820). Based on the amount of time the appointment has been delayed and the timing of the subsequent appointments, the calendar application determines that a need for rescheduling other appointments exists and confirms with the participant the desire to reschedule the other appointments (1825). The calendar application then automatically reschedules the subsequent appointments within the calendar application such that the starting time of each of the subsequent appointments is postponed to account for the delay associated with the current appointment (1830). The calendar application also may notify the participants of each of the subsequent appointments and inform them of such change, so that they can change their schedule according.

Other implementations are also contemplated.

What is claimed is:

1. A method comprising:
identifying, using at least one processor, a first geographic location associated with a user of a calendar application;
identifying, using the at least one processor, a second geographic location and a start time associated with an appointment in the calendar application;
identifying, using the at least one processor, a travel time associated with a route extending from the first geographic location to the second geographic location;
incorporating, using the at least one processor, the travel time into a calendar event in the calendar application;
identifying, using the at least one processor, a specified time associated with the user's travel to the second geographic location; and
providing, using the at least one processor, a reminder to the user at the specified time to inform the user to leave the first geographic location in order to arrive at the second geographic location in time for the appointment.

2. The method of claim 1, further comprising enabling presentation of the calendar event within a calendar interface.

3. The method of claim 2, wherein the calendar event is separate from a calendar event associated with the appointment.

4. The method of claim 2, wherein the calendar event is presented within the calendar interface before a calendar event associated with the appointment.

5. The method of claim 2, wherein a size of the calendar event, as presented within the calendar interface, corresponds to the travel time.

6. The method of claim 2, further comprising enabling presentation of a description of the calendar event.

7. The method of claim 1, further comprising providing, by way of the calendar event, directions for traveling from the first geographic location to the second geographic location.

8. The method of claim 1, wherein identifying the first geographic location comprises detecting a location of a mobile device associated with the user.

9. The method of claim 1, further comprising providing, by way of a graphical user interface, a selectable option for requesting a reservation of a time block for travel time.

10. The method of claim 9, further comprising creating the calendar event based on a selection of the selectable option by the user.

11. The method of claim 10, wherein the selectable option comprises a check box.

12. The method of claim 1, further comprising:
detecting a change associated with the appointment; and
in response to the change associated with the appointment, modifying or canceling the calendar event.

13. A system comprising:
at least one processor; and
at least one non-transitory computer readable medium storing instructions thereon that, when executed by the at least one processor, cause the system to:
identify a first geographic location associated with a user of a calendar application;
identify a second geographic location and a start time associated with an appointment in the calendar application;
identify a travel time associated with a route extending from the first geographic location to the second geographic location;
incorporate the travel time into a calendar event in the calendar application;
identify, using the at least one processor, a specified time associated with the user's travel to the second geographic location; and
provide, using the at least one processor, a reminder to the user at the specified time to inform the user to leave the first geographic location in order to arrive at the second geographic location in time for the appointment.

14. The system of claim 13, further comprising instructions that, when executed by the at least one processor, cause the system to enable presentation of the calendar event within a calendar interface.

15. The system of claim 14, wherein the calendar event is separate from a calendar event associated with the appointment.

16. The system of claim 14, wherein the calendar event is presented within the calendar interface before a calendar event associated with the appointment.

17. The system of claim 13, wherein the system is incorporated into a mobile device associated with the user.

18. The system of claim 13, further comprising instructions that, when executed by the at least one processor, cause the system to provide, by way of a graphical user interface, a selectable option for requesting a time block be reserved for travel time.

19. The system of claim 18, further comprising instructions that, when executed by the at least one processor, cause the system to create the calendar event based on a selection of the selectable option by the user.

20. The system of claim 13, further comprising instructions that, when executed by the at least one processor, cause the system to:
detect a change associated with the appointment; and
in response to the change associated with the appointment, modify or cancel the calendar event.

21. A mobile device comprising:
a display;
at least one processor; and
a non-transitory computer readable medium storing instructions that, when executed by the at least one processor, cause the at least one processor to:
identify a first geographic location and an end time associated with a first appointment in a calendar application;
identify a second geographic location and a start time associated with a second appointment in the calendar application;
identify a travel time associated with travel from the first geographic location to the second geographic location;
create a calendar event associated with the travel time;
identify, using the at least one processor, a specified time associated with the travel from the first geographic location to the second geographic location; and
provide, using the at least one processor, a reminder at the specified time to inform a user of the mobile device to leave the first geographic location in order to arrive at the second geographic location in time for the second appointment.

* * * * *